US007966156B1

(12) United States Patent
Frei et al.

(10) Patent No.: US 7,966,156 B1
(45) Date of Patent: *Jun. 21, 2011

(54) METHOD, COMPUTER PROGRAM, AND SYSTEM FOR INTRINSIC TIMESCALE DECOMPOSITION, FILTERING, AND AUTOMATED ANALYSIS OF SIGNALS OF ARBITRARY ORIGIN OR TIMESCALE

(75) Inventors: Mark G. Frei, Lawrence, KS (US); Ivan Osorio, Leawood, KS (US)

(73) Assignee: Flint Hills Scientific LLC, Lawrence, KS (US)

( * ) Notice: Subject to any disclaimer, the term of this patent is extended or adjusted under 35 U.S.C. 154(b) by 362 days.

This patent is subject to a terminal disclaimer.

(21) Appl. No.: 12/217,893

(22) Filed: Jul. 9, 2008

Related U.S. Application Data

(63) Continuation of application No. 11/415,064, filed on May 1, 2006, now Pat. No. 7,401,008, which is a continuation of application No. 10/684,189, filed on Oct. 10, 2003, now Pat. No. 7,054,792.

(60) Provisional application No. 60/418,141, filed on Oct. 11, 2002.

(51) Int. Cl.
*G06F 17/00* (2006.01)
*G06F 19/00* (2011.01)

(52) U.S. Cl. .............. 702/190; 702/70; 702/74; 702/72; 708/309

(58) Field of Classification Search .................. 702/190, 702/70, 74, 72
See application file for complete search history.

(56) References Cited

U.S. PATENT DOCUMENTS

| 6,311,130 | B1 * | 10/2001 | Huang | 702/2 |
| 7,054,792 | B2 * | 5/2006 | Frei et al. | 702/190 |
| 7,065,465 | B2 * | 6/2006 | Chen et al. | 702/116 |
| 7,401,008 | B2 * | 7/2008 | Frei et al. | 702/190 |
| 7,409,320 | B2 * | 8/2008 | Wegerich | 702/189 |
| 2002/0183931 | A1 * | 12/2002 | Anno | 702/14 |
| 2003/0033094 | A1 * | 2/2003 | Huang | 702/39 |
| 2003/0139692 | A1 * | 7/2003 | Barrey et al. | 600/595 |

* cited by examiner

*Primary Examiner* — Hal D Wachsman
(74) *Attorney, Agent, or Firm* — Donald R. Schoonover

(57) ABSTRACT

A method and system for intrinsic timescale decomposition, filtering, and automated analysis of signals of arbitrary origin or timescale including receiving an input signal, determining a baseline segment and a monotonic residual segment with strictly negative minimum and strictly positive maximum between two successive extrema of the input signal, and producing a baseline output signal and a residual output signal. The method and system also includes determining at least one instantaneous frequency estimate from a proper rotation signal, determining a zero-crossing and a local extremum of the proper rotation signal, and applying interpolation thereto to determine an instantaneous frequency estimate thereof. The method and system further includes determining at least one instantaneous frequency estimate from a proper rotation signal, extracting an amplitude-normalized half wave therefrom and applying an arcsine function to the amplitude-normalized half wave to determine an instantaneous frequency estimate of the proper rotation signal.

4 Claims, 19 Drawing Sheets

Fig. 5a — Sample signal
Fig. 5b — Windowed Fourier-based spectrogram (16 pts/win) PRIOR ART
Fig. 5c — Windowed Fourier-based spectrogram (256 pts/win) PRIOR ART
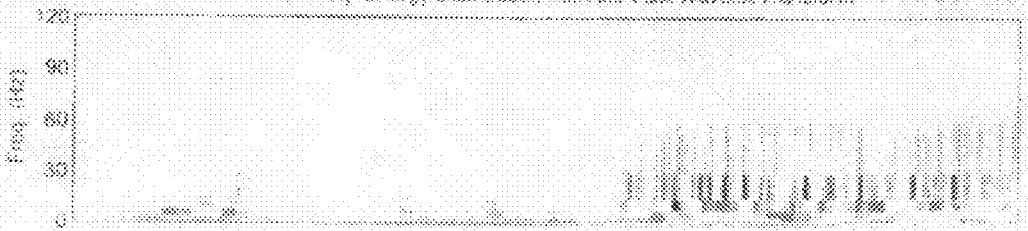
Fig. 5d — Time-Freq-Energy Distribution from the Fast Wavelet Transform PRIOR ART
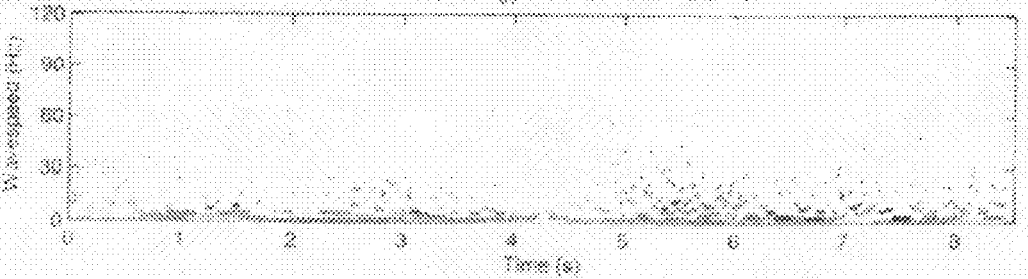
Fig. 5e — Time-Freq-Energy Distribution from the ITD

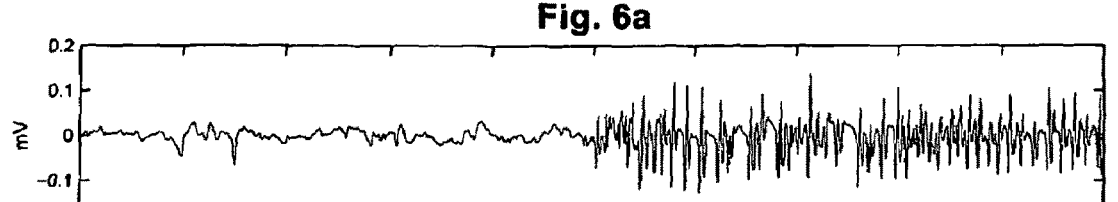
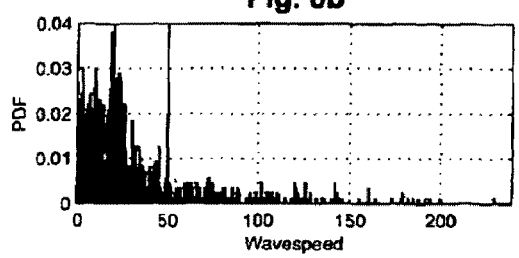 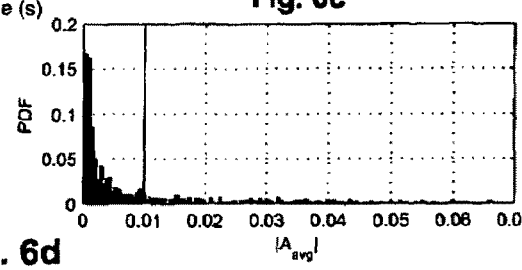
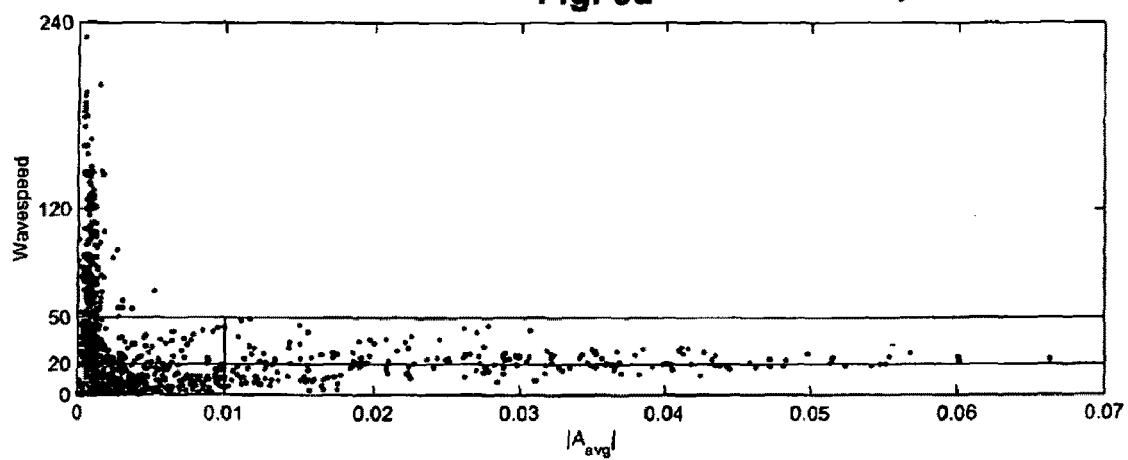
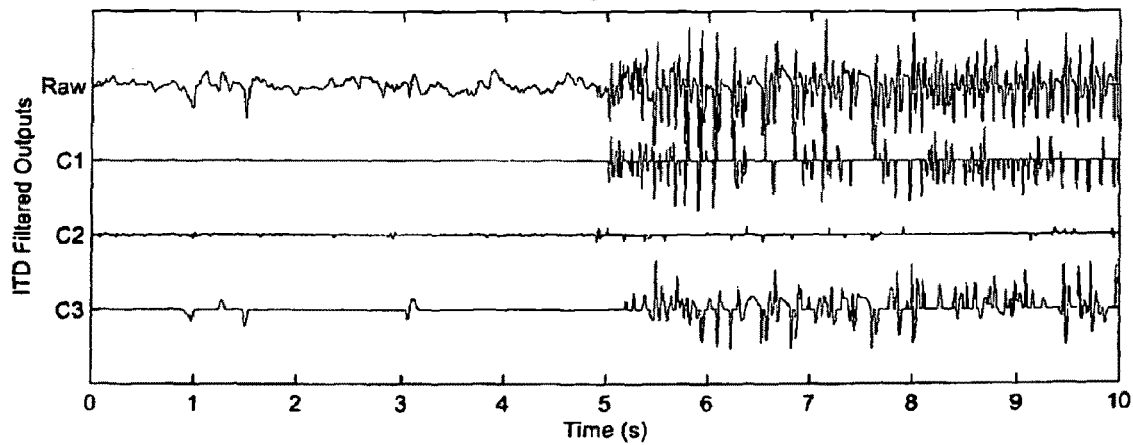

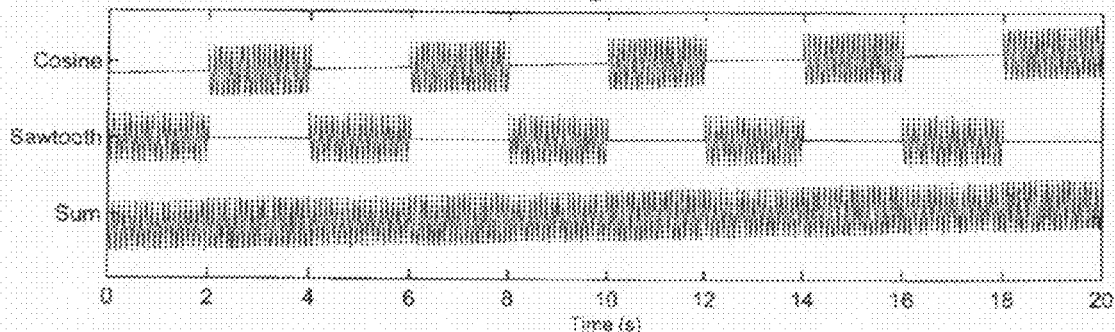
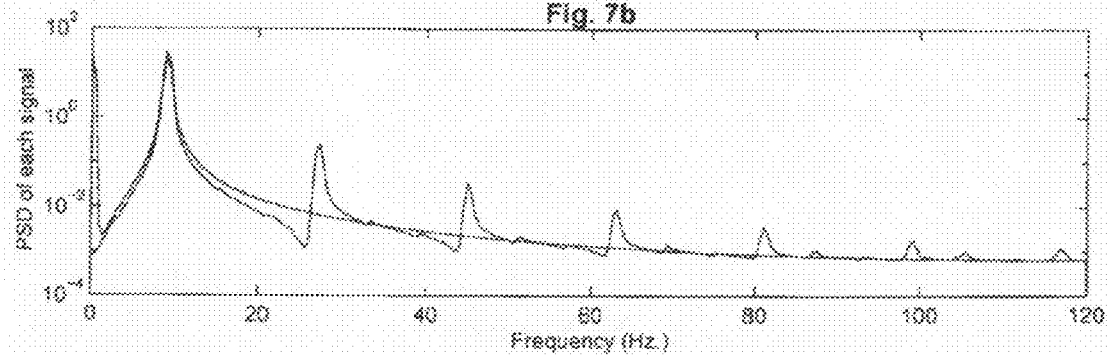
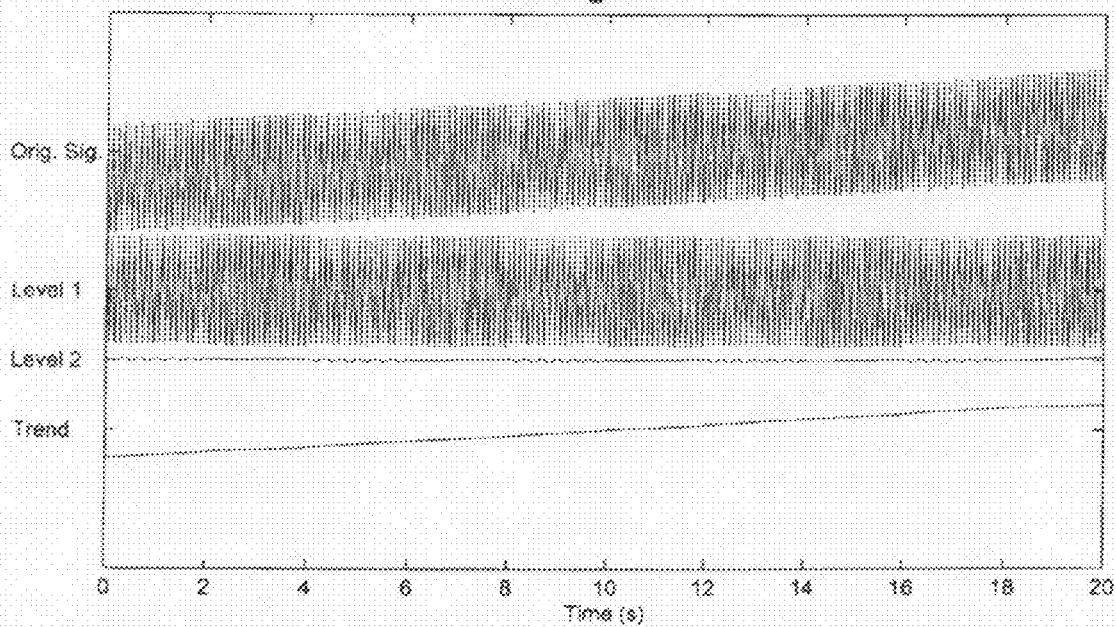

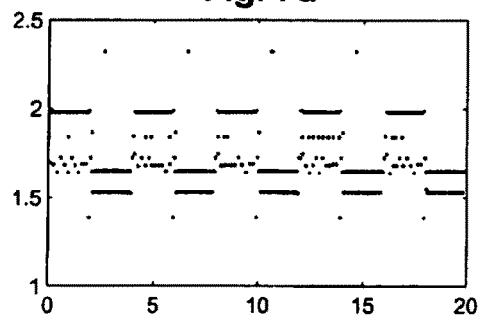
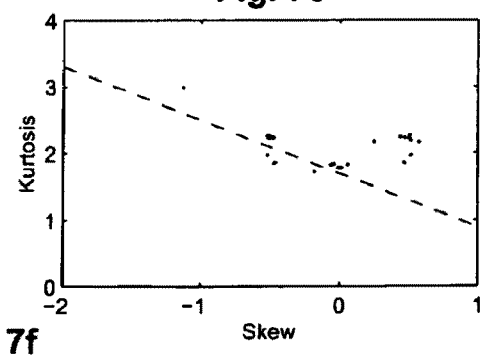
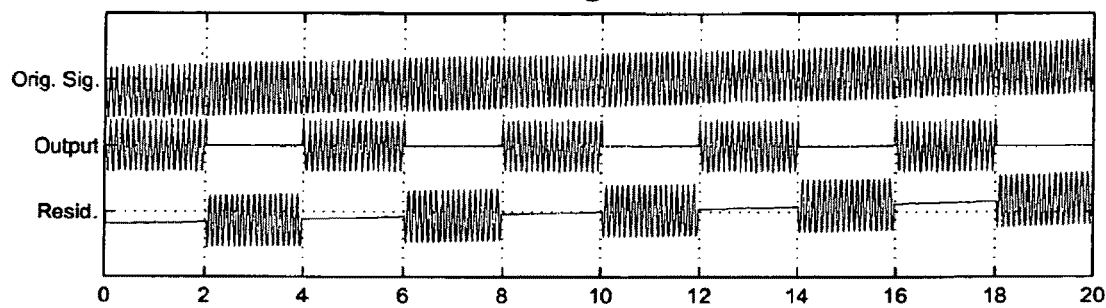
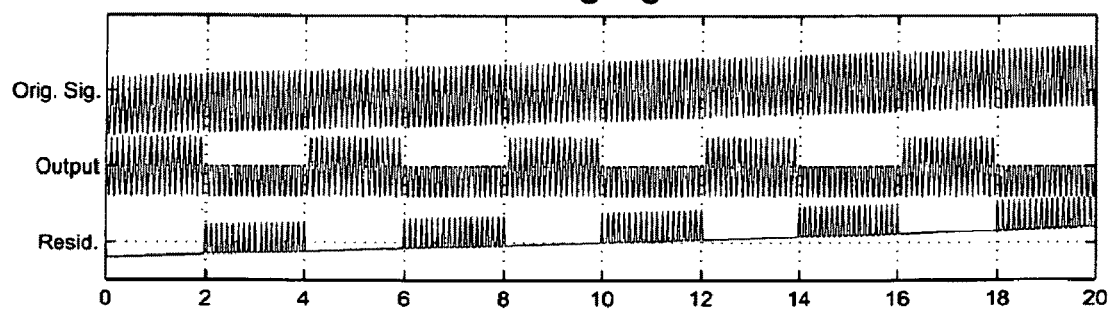
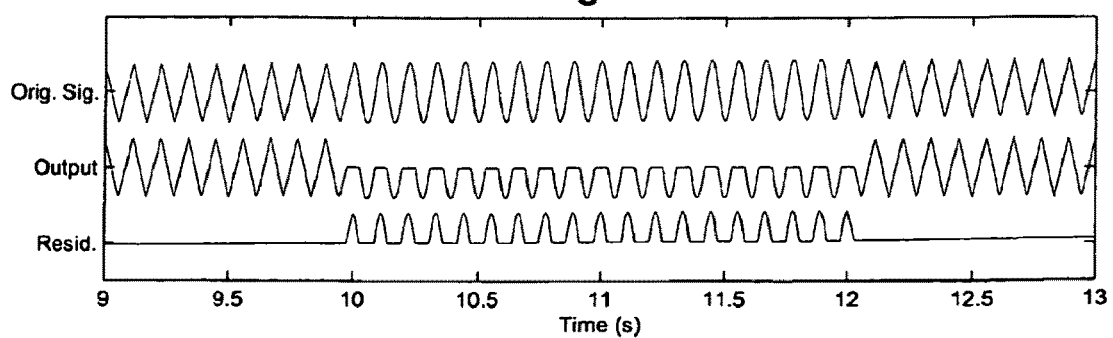

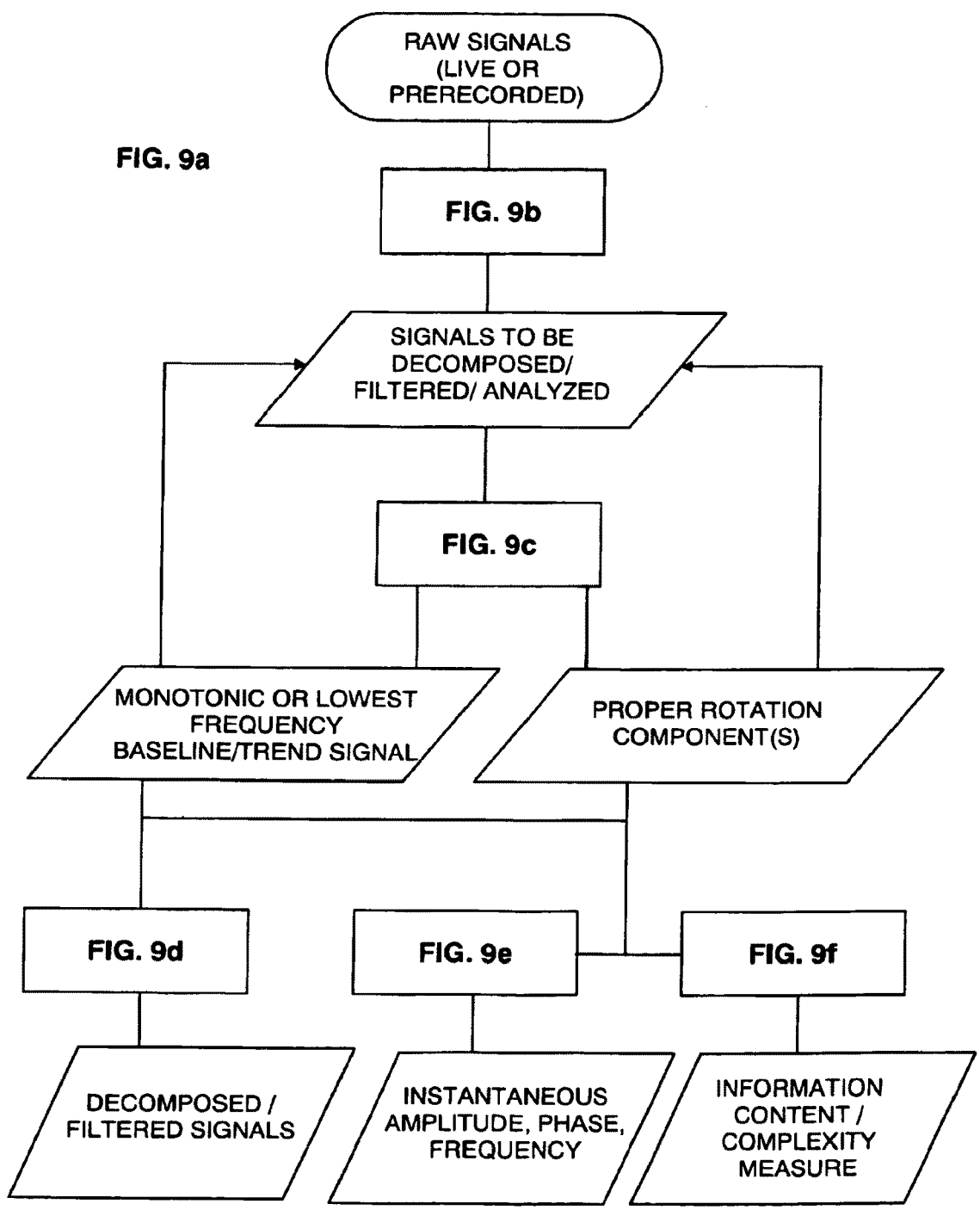

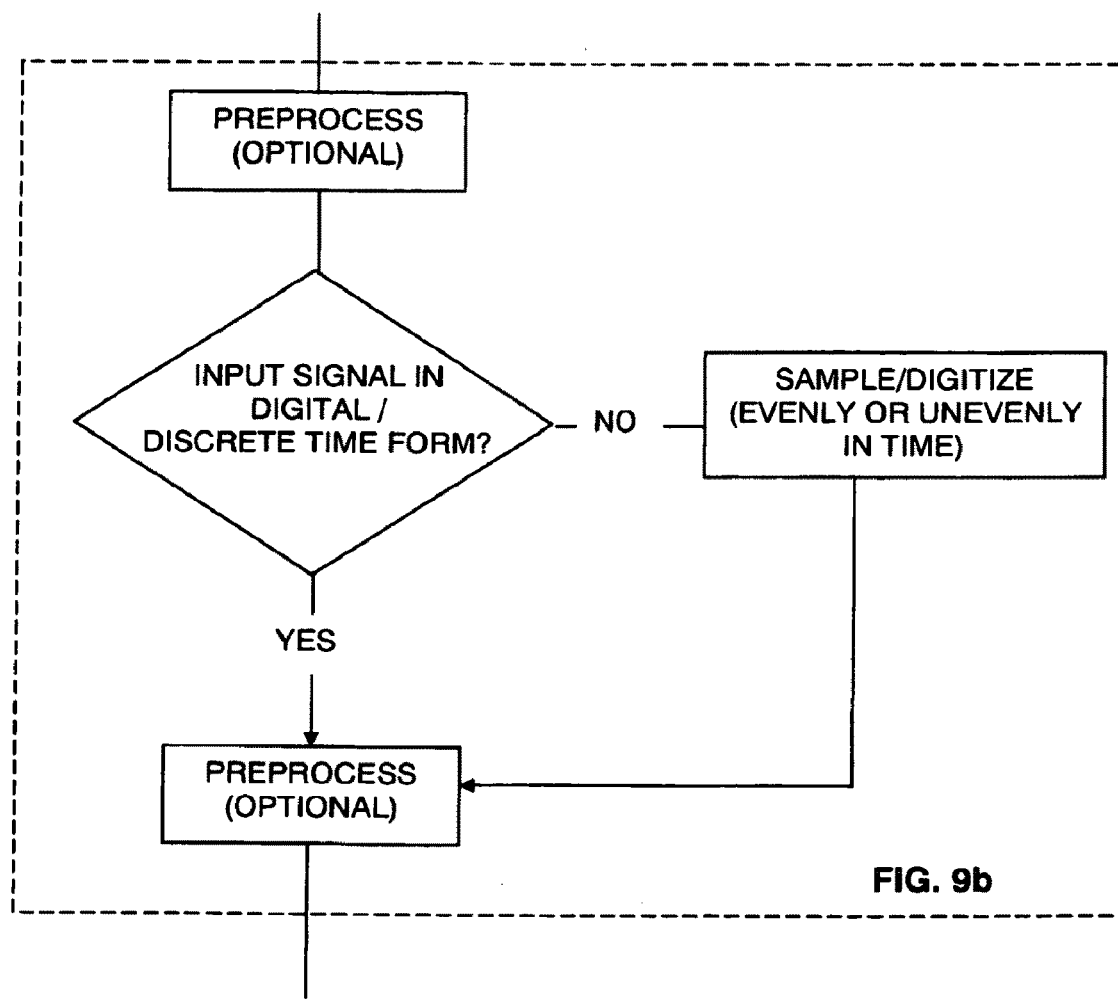

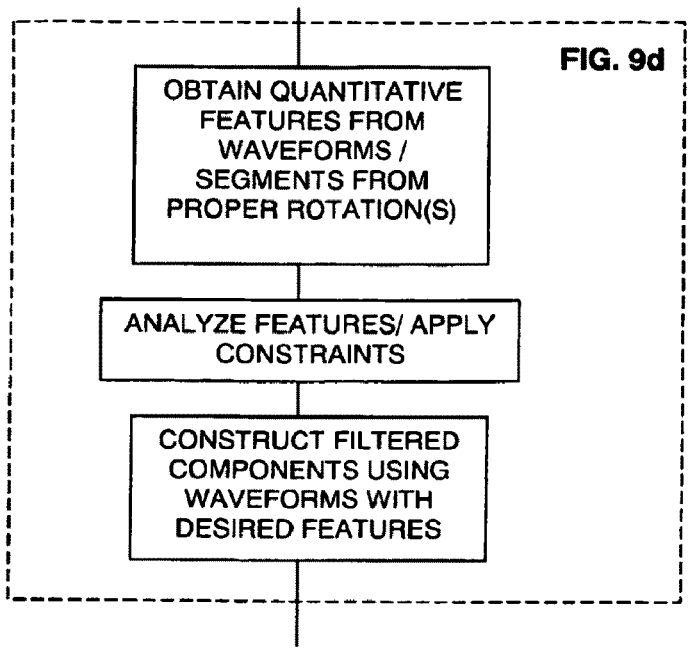
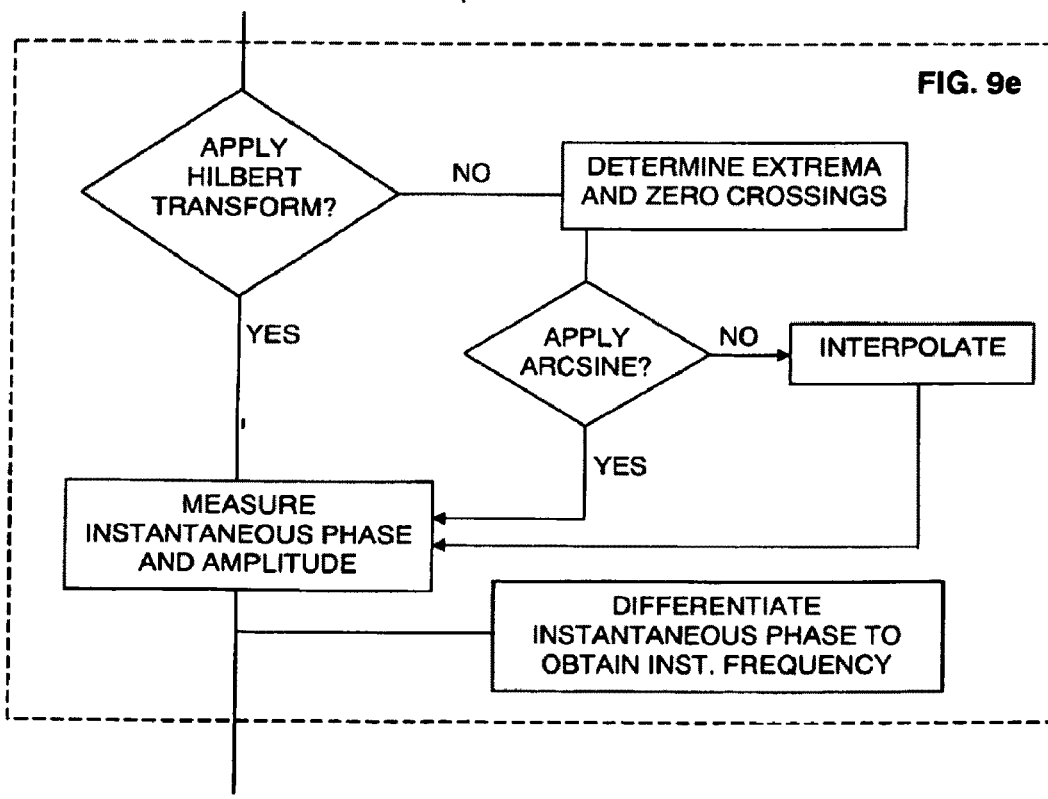

METHOD, COMPUTER PROGRAM, AND SYSTEM FOR INTRINSIC TIMESCALE DECOMPOSITION, FILTERING, AND AUTOMATED ANALYSIS OF SIGNALS OF ARBITRARY ORIGIN OR TIMESCALE

CROSS REFERENCE TO RELATED APPLICATIONS

This application is a continuation application of U.S. application Ser. No. 11/415,064 filed May 1, 2006 and now U.S. Pat. No. 7,401,008; which is a continuation of U.S. patent application Ser. No. 10/684,189 filed Oct. 10, 2003 and now U.S. Pat. No. 7,054,792, issued May 30, 2006; which claims priority of Provisional Patent Application No. 60/418,141 filed Oct. 11, 2002. International application No. PCT/US03/32364, filed Oct. 9, 2003 and published Apr. 22, 2004 as WO 2004/034231, claims priority of Provisional Patent Application No. 60/418,141.

COMPUTER PROGRAM LISTING APPENDIX

An appendix containing five computer files on compact disk is included in this application. The files, which are formatted for an IBM PC/MS Windows-compatible computer system, are as follows:

| | |
|---|---|
| contents.txt | 864 bytes; |
| itd.m | 964 bytes; |
| itd_step.m | 1,528 bytes; |
| itd_sift.m | 1,477 bytes; |
| pangle.m | 2,881 bytes; |
| Itd.cpp | 3,619 bytes; |
| Itd.h | 1,742 bytes; |
| ItdStep.cpp | 12,300 bytes; |
| ItdStep.h | 6,180 bytes; |
| itd_rec.cpp | 3,384 bytes; |
| FhsBuffers.h | 4,275 bytes; |

These files were loaded on the non-rewritable CD-R disc on Oct. 7, 2003 and are incorporated herein by reference.

BACKGROUND OF THE INVENTION

1. Field of the Invention

This invention relates generally to a system for analyzing signals and data and, more specifically but without limitation, to a system for analyzing non-linear and/or non-stationary signals and data.

2. Description of Related Art

Data analysis is an essential part of pure and applied research in many disciplines. In many practical applications, the raw data have characteristics that change over time, commonly referred to as being non-stationary and, additionally, very often result from non-linear processes. Unfortunately, the majority of existing methods for analyzing data are designed to treat stationary, linear data.

Another common and serious problem of data analysis is the existence of noise and/or non-stationary trend. Common practice to deal with these problems has involved application of band pass filters to the data. However, these filters are Fourier based and, as such, typically result in the introduction of spurious harmonics in non-stationary data. Therefore, Fourier-based filters have limited utility and practical value for use with non-stationary and/or non-linear data. In addition, the (low frequency) signal trend can carry significant and useful information about the process being analyzed, and thus should not be simply filtered out. Prior art methods for processing non-stationary data include Fourier analysis, wavelet analysis, the Wigner-Ville distribution, the evolutionary spectrum, the empirical orthogonal function expansion, and the empirical mode decomposition. These prior art methods can be briefly described as follows.

Fourier Analysis.

Traditional methods of time-frequency-energy analysis are based on Fourier transforms and are designed for stationary and linear processes. The application of these methods to analysis of non-stationary, non-linear data can give misleading results. For example, the Fourier spectrum defines uniform harmonic components globally. Therefore, Fourier analysis needs many additional harmonic components in order to simulate non-stationary data, which are not uniform globally. As a result, Fourier analysis tends to spread signal energy over a wide frequency range. As is well known by those having skill in the art, the faster the change in the time domain, the wider the frequency range. Unfortunately, many of the components, that are added in order to simulate the non-stationary nature of the data in the time domain, divert energy to a much wider frequency domain. For example, a single impulse, a signal whose deviation from constancy occurs at a single moment in time, requires infinitely many frequencies with identical power to represent it. Constrained by energy conservation, the spurious harmonics that are added and the wide frequency spectrum required to simulate the non-linearity cannot faithfully represent the true energy density in the resulting frequency space.

Further, Fourier spectral analysis utilizes linear superposition of trigonometric functions. Such analysis needs additional harmonic components in order to simulate the effects of non-linearity, such as deformed wave profiles. Whenever the form of the data deviates from a pure sine or cosine function, the Fourier spectrum will contain harmonics. As explained above, both non-stationarity and non-linearity can induce spurious harmonic components that cause energy spreading. The resulting consequence is a misleading or incorrect time-frequency distribution of signal energy for non-linear and/or non-stationary data.

Many data analysis methods have been developed based on Fourier transforms. The spectrogram is the most basic and common method, which is a finite-time window Fourier spectral analysis that is repeated in moving-time windows. By successively sliding the window along the time axis, a time-frequency-energy distribution is obtained. Since such a distribution relies on the traditional Fourier spectral analysis, the method assumes the data to be piecewise stationary. This assumption is not valid for most non-stationary data. Even if the data were piecewise stationary, it is highly unlikely in most cases that the window size adopted would coincide with the stationary time scale. Furthermore, there are practical difficulties in applying the method. In order to localize an event in time with good temporal precision, the window width must be narrow. Unfortunately, the frequency resolution worsens as window size decreases. Although the conflict in these requirements can be mitigated by different techniques, it renders the applicability of Fourier analysis to non-linear, non-stationary data of limited use.

Wavelet Analysis.

Wavelet analysis, which has become extremely popular during the past decade, is an attempt to overcome the problems of windowed Fourier analysis by utilization of a basis of functions to represent a signal that contains elements having different time scales. This approach allows wavelet analysis to detect changes that occur rapidly, i.e., those on a small time scale, with good temporal resolution but poor frequency resolution, or slowly, i.e., those on a large time scale, with good frequency resolution but poor temporal resolution. More specifically, the wavelet analysis approach is essentially an adjustable-window Fourier spectral analysis. Wavelet analysis is useful for analyzing data with gradual frequency changes. Primary applications of wavelet analysis have been in areas of edge detection and audio and image signal compression. Limited applications also include analysis of time-frequency distribution of energy in time series and of two-dimensional images such as fingerprints. Unfortunately, the finite length of the basic wavelet function results in energy leakage across different levels of resolution in a multi-resolution analysis, which causes quantitative applications of the time-frequency-energy distribution to be more difficult.

Sometimes, the interpretation of the wavelet can also be counterintuitive. For example, the more temporally localized the basic wavelet, the higher the frequency range will be. Therefore, to define a change occurring locally, the analytic result may occur in a high frequency range. In other words, if a local event occurs only in a low frequency range, the effects of that local event may only appear in a high frequency range. In many applications, the interpretation of such a result would be difficult if not impossible.

Another difficulty with wavelet analysis is that it is not adaptive. Once the basic wavelet is selected, the basis for the analysis is completely determined to the extent obtainable from the selected basic wavelet, and all information of the input signals is represented in terms of that basis. Although the basis can be specially selected for an individual application, the information obtained depends heavily on the properties inherent to that basis rather than solely on the intrinsic properties of the signals being studied. Malvar wavelets, Wavelet Packets, and Matching Pursuit methods have been developed to overcome some of these limitations to more accurately represent a signal having dynamics that vary with time and that include both stationary and non-stationary characteristics. Unfortunately, these developments in wavelet analysis continue to suffer from the representation of the signal information in terms of a pre-selected basis of functions that often has little or nothing to do with the dynamics and other characteristics of the input signals.

The Wigner-Ville Distribution.

The Wigner-Ville distribution, sometimes referred to as the Heisenberg wavelet, is the Fourier transform of the central covariance function. The difficulty with this method is the severe cross terms indicated by the existence of negative power for some frequency ranges. The Wigner-Ville distribution has been used to define wave packets that reduce a complicated data set into a finite number of simple components. Although this approach can be applied to a wide variety of problems, applications to nonstationary or nonlinear data are extremely complicated. Further, such applications again suffer from the same limitation of the other prior art methods described above in that the bases for representation of information are not derived from the data itself.

Evolutionary Spectrum.

The Evolutionary Spectrum approach is used to extend the classic Fourier spectral analysis to a more generalized basis, namely from sine or cosine functions to a family of orthogonal functions indexed by time and defined for all real frequencies. Thus, the original signal can be expanded into a family of amplitude modulated trigonometric functions. The problem with this approach, which severely limits its applicability, is due to the lack of means for adequately defining the basis. In principle, the basis has to be defined a posteriori in order for this method to work. To date, no systematic method of constructing such a basis exists. Therefore, it is impossible to construct an evolutionary spectrum from a given set of data. As a result, applications of the evolutionary spectrum method have changed the approach from data analysis to data simulation. Thus, application of the evolutionary spectrum approach involves assumptions causing the input signal to be reconstituted based on an assumed spectrum. Although there may be some general resemblance of a simulated input signal to the corresponding real data, it is not the data that generated the spectrum. Consequently, evolutionary spectrum analysis has very little useful application, if any.

The Empirical Orthogonal Function Expansion.

Empirical orthogonal function expansion ("EOF"), also known as "principal component analysis" or "singular value decomposition," provides a means for representing any function of state and time as a weighted sum of empirical eigenfunctions that form an orthonormal basis. The weights are allowed to vary with time. EOF differs from the other methods described hereinabove in that the expansion basis is derived from the data. The critical flaw of EOF is that it only gives a variance distribution of the modes defined by the basis functions, and this distribution by itself gives no indication of time scales or frequency content of the signal. In addition, any single component of the non-unique decomposition, even if the basis is orthogonal, does not usually provide any physical meaning. The Singular Spectral Analysis ("SSA") method, which is a variation of EOF, is simply the Fourier transform of EOF. Unfortunately, since EOF components from a non-linear and non-stationary data set are not linear and stationary, use of Fourier spectral analysis generated by SSA is flawed. Consequently, SSA is not a genuine improvement of EOF. Although adaptive in nature, the EOF and SSA methods have limited applicability.

The Empirical Mode Decomposition.

The empirical mode decomposition ("EMD") method, involves two major steps. The first step is the application of an algorithm for decomposing physical signals, including those that may be non-linear or non-stationary, into a collection of Intrinsic Mode Functions ("IMFs"), which are supposedly indicative of intrinsic oscillatory modes in the physical signals. More specifically, the cornerstone of the EMD method is the extraction of a signal baseline from a physical signal wherein the baseline is computed as the mean value of the upper and lower envelopes of the physical signal. The upper envelope is defined by cubic splines connecting the local maxima of the physical signal, and the lower envelope is defined by cubic splines connecting the local minima of the physical signal. The signal baseline is then extracted, or subtracted, from the original signal to obtain an IMF having the first and highest frequency present in the signal.

A goal of the first step is to obtain a well-behaved IMF prior to performing the second step: applying a Hilbert Transform to the IMF. "Well-behaved" means that the IMF should be a "proper rotation," i.e., all local maxima are strictly positive and all local minima are strictly negative. This does not necessarily happen with one step of EMD, and thus a laborious, iterative "sifting" process is applied to the signal baseline and is terminated when a set of "stopping criteria" are satisfied, such as when the resulting IMF either becomes a proper rotation or when some other criteria are reached (e.g., a predetermined number of iterations exhausted) without obtaining a proper rotation. The stopping criterion is based on a combination of (i) limiting the amount of computational energy expended, and (ii) having the constructed IMF closely approximate the desired property. When the first IMF function has been obtained, it is subtracted from the signal and the process is repeated on the resulting lower frequency signal.

This process is repeated again and again until the decomposition is completed in the window of signal being analyzed.

The sifting process has two goals: (i) to separate out high frequency, small amplitude waves that are "riding" atop, or superimposed on, larger amplitude, lower frequency waves, and (ii) to smooth out uneven amplitudes in the IMF being extracted. Unfortunately, these goals are often conflicting for non-stationary signals wherein riding waves may be isolated and/or are highly variable in amplitude. As a result, the sifting process must be applied cautiously as it can potentially obliterate the physically meaningful amplitude fluctuations of the original signal.

As noted, once the IMFs have been obtained, the second step of the EMD method is to apply the Hilbert Transform to the IMFs which, provided the IMFs are well-behaved, results in quantified instantaneous frequency measurements for each component as a function of time.

However, the EMD method suffers from a number of shortcomings that lead to inaccuracies in depiction of signal dynamics and misleading results in subsequent signal analysis, as follows:

(a) The construction of the IMF baseline as the mean of the cubic spline envelopes of the signal suffers from several limitations, including the time scale being defined only by the local extrema of the original signal, ignoring the locations of the rest of the critical points, such as inflection points and zero crossings, which are not preserved by the sifting process.

(b) The EMD transformation is window-based; the sifting procedure and other processing requires an entire window of data to be repeatedly processed. The resulting information for the entire window is not available until the window's processing has been completed. On average, this causes a delay in obtaining the resulting information of at least half the window length plus the average computational time for a window of data. As a result, an insurmountable problem is created for the EMD in real-time/online applications. In order to obtain the information quickly, the window length should be short. However, short windows have less accurate results due to boundary or edge effects, and are incapable of resolving frequency information on a time scale longer than the window length itself.

(c) The EMD method is computationally expensive, and also subject to uncertain computational expenses. The EMD method requires repeated sifting of components in order to obtain well-behaved IMFs or until stopping criteria are satisfied. Such a procedure may require numerous iterations and may not occur in finite time. Thus, the method often will not result in IMFs with the desired proper rotation property, even when sifting numerous times. Also, the IMFs are generally dependent on the parameters of the algorithm that define the stopping criteria for sifting.

(d) Overshoots and undershoots of the interpolating cubic splines generate spurious extrema, and shift or exaggerate the existing ones. Therefore, the envelope-mean method of the extraction of the baseline does not work well in certain cases, such as when there are gaps in the data or data are unevenly sampled, for example. Although this problem can be mitigated by using more sophisticated spline methods, such as the taut spline, such improvements are marginal. Moreover, splines are not necessarily well suited to approximate long timescale trends in real data.

(e) The EMD method does not accurately preserve precise temporal information in the input signal. The critical points of the IMFs, such as the extrema, inflection points, etc., are not the same as those of the original signal. Also, the EMD method, being exclusively determined by extrema, is deficient in its ability to extract weak signals embedded in stronger signals.

(f) Since the cubic splines can have wide swings at the ends, the envelope-mean method of the EMD method is particularly unsuitable for real-time applications or for applications utilizing a narrow window. The end effects also propagate to the interior and significantly corrupt the data, as the construction of IMFs progresses, as can be seen in FIGS. 1a-2c. FIG. 1a illustrates the application of the EMD to a test signal (top-most signal) to produce IMF components (displayed below test signal). This panel illustrates end effects, spline-related instabilities (most noticeable in bottom components), and inability to extract the readily apparent signal baseline. The intrinsic timescale decomposition, sometimes referred to herein as ITD, (shown in FIG. 1b) separates the same test signal (top-most signal) into stable components (displayed below test signal), demonstrating the fact that that ITD has no end effect propagation beyond the first two extrema at each level and allows correct identification of the trend (dashed line). FIG. 2a shows a brain wave input signal (electrocorticogram; 'ECoG') containing an epileptic seizure used to illustrate decomposition differences between EMD and ITD. EMD-generated (lower left panel) and ITD-generated (lower right panel) decompositions of the cumulative sum of the raw signal show that ITD, unlike EMD, does not generate extraneous components and correctly reveals large timescale variations of the signal (DC trend).

(g) The application of the Hilbert Transform to track instantaneous frequency is only appropriate when frequency is varying slowly with respect to amplitude fluctuations which, unfortunately is a condition not satisfied by many non-stationary signals. Moreover, proper rotations, which are not guaranteed by the EMD, are necessary for the existence of a meaningful, instantaneous frequency that is restrictive and local.

(h) Primarily due to the sifting procedure, the EMD method causes (i) a smearing of signal energy information across different decomposition levels, and (ii) an intra-level smoothing of energy and frequency information that may not reflect the characteristics of the signal being decomposed or analyzed. The potential negative effects of over-sifting include the obliteration of physically meaningful amplitude fluctuations in the original signal. Also, the inter-level smearing of energy and limitation of decomposition in a window of data create inaccuracies in the EMD's representation of the underlying signal trend, especially if the signal trend is longer than a single window.

(i) The EMD method cannot guarantee that the IMF components will be "proper rotations," even with the sifting reiterations. Often, in practice, they are not.

(j) The EMD method is not well behaved if the data is unevenly sampled or if it is discontinuous, and, therefore, may not preserve intact phase and morphology characteristics of the signal.

What is needed is a system for reliably analyzing non-linear and/or non-stationary signals and data capable of decomposing them and/or extracting precise time-frequency-energy distribution information.

SUMMARY OF THE INVENTION

In a method for decomposing an input signal into a baseline signal and a residual signal, the steps including receiving an input signal into a processor, determining a monotonic residual segment with strictly negative minimum and strictly positive maximum and a baseline segment wherein said segments are defined on a time interval comprising the interval between two successive extrema of the input signal and wherein the input signal on that interval is the sum of the baseline and residual segments, and producing a baseline output signal and a residual output signal wherein the baseline signal is obtained from the baseline segment and the residual signal is obtained from the residual segment as determined, such that the sum of the baseline and residual signals is equal to the input signal thereby forming a decomposition of the input signal.

In a method for signal decomposition, the steps including receiving an input signal into a processor, using the input signal to construct a baseline signal component such that subtraction of the baseline signal component from the input signal always produces a proper rotation signal.

In a method for determining at least one instantaneous frequency estimate from a proper rotation signal, the steps including inputing a proper rotation signal to a processor, determining a zero-crossing and a local extremum of the proper rotation signal, and applying linear interpolation to the proper rotation signal between the zero-crossing and the local extremum to determine an instantaneous frequency estimate of the proper rotation signal.

In a method for determining at least one instantaneous frequency estimate from a proper rotation signal, the steps including inputing a proper rotation signal to a processor, extracting an amplitude-normalized half wave from the proper rotation signal, and applying an arcsine function to the amplitude-normalized half wave to determine an instantaneous frequency estimate of the proper rotation signal.

Principal Objects and Advantages of the Invention

The principal objects and advantages of the present invention include: providing a system and method for analyzing non-stationary and/or non-linear signals; providing such a system and method that can operate in real-time due to its computational simplicity, recursive nature, elimination of need for sifting, and absence of significant end effects; providing such a system and method that adapts to any timescale and uses complete signal information, including all critical points such as inflection points and zero crossings; providing such a system and method that can extract weak signals embedded in stronger signals; providing such a system and method that provides precise time-frequency-energy localization, either simultaneously via the Hilbert transform or novel methods for instantaneous phase and instantaneous frequency computation not requiring use of this transform, on other timescales, such as the inter-extrema timescale or the inter-critical point timescale for example; providing such a system and method having the ability to interpolate adjacent critical points using the signal itself; providing such a system that is well-behaved even if the data is unevenly sampled or is discontinuous; providing such a system that may be applied to analysis of multi-dimensional signals or data such as images or surfaces; providing such a system and method that has the ability to preserve intact phase and morphology characteristics of the signal; providing such a system and method that can extract proper rotation components in one step; providing such a system and method wherein all extracted components are guaranteed to be "proper rotations" with all strictly positive local maxima and all strictly negative local minima; providing such a system and method wherein the decomposition is completely determined by the input signal; providing such a system and method that is fully adaptive and local in time; providing such a system and method wherein each step consists only of comparisons to determine extrema followed by a piece-wise linear transformation of buffered data between two successive extrema to produce the desired signal components; providing such a system and method that preserves temporal information in the signal; providing such a system and method wherein the critical points of all extracted components, such as the points in time at which local maxima, local minima, inflection points, etc., occur, coincide precisely with critical points of the original signal; providing such a system and method that allows waveform feature-based discrimination to be used in combination with single wave analysis and classification to produce powerful and flexible new signal filters for use in decomposition, detection and compression; providing such a system and method that substantially eliminate boundary or windowing effects; providing such a system and method for determining at least one instantaneous frequency estimate from a proper rotation signal using linear interpolation of the proper rotation signal between a zero-crossing and a local extremum; providing such a system and method for determining at least one instantaneous frequency estimate from a proper rotation signal using an arcsine function applied to an amplitude-normalized half wave of the proper rotation signal; and generally providing such a system and method that is effective in operation, reliable in performance, capable of long operating life, and particularly well adapted for the proposed usages thereof.

Other objects and advantages of the present invention will become apparent from the following description taken in conjunction with the accompanying drawings, which constitute a part of this disclosure and wherein are set forth exemplary embodiments of the present invention to illustrate various objects and features thereof.

BRIEF DESCRIPTION OF THE DRAWINGS

FIGS. 2b-2c are a comparison of the prior art method of EMD with the ITD as applied to a brain wave signal as shown in FIG. 2a.

FIGS. 5a-5d are comparisons between the prior art methods of Fourier analysis and wavelet analysis and the ITD of the present invention in FIGS. 5e-5j in determining time-frequency-energy (TFE) distributions from a sample signal as shown in FIG. 5a.

FIGS. 6a-6g are illustrations of the ITD-based method.

FIGS. 7a-7h are illustrations of the ability of the ITD-based filtering method, used to differentiate between two types of waves that have significantly overlapping spectral characteristics.

FIG. 9a is a flow chart representation of the ITD method of the present invention.

FIG. 9b is a detailed flow chart representation of a portion of the ITD method of the present invention as indicated at FIG. 9a.

FIG. 9c is a detailed flow chart representation of a portion of the ITD method of the present invention as indicated at FIG. 9a.

FIG. 9d is a detailed flow chart representation of a portion of the ITD method of the present invention as indicated at FIG. 9a.

FIG. 9e is a detailed flow chart representation of a portion of the ITD method of the present invention as indicated at FIG. 9a.

FIG. 9f is a detailed flow chart representation of a portion of the ITD method of the present invention as indicated at FIG. 9a.

DETAILED DESCRIPTION OF THE PREFERRED EMBODIMENTS

Figure 1A:
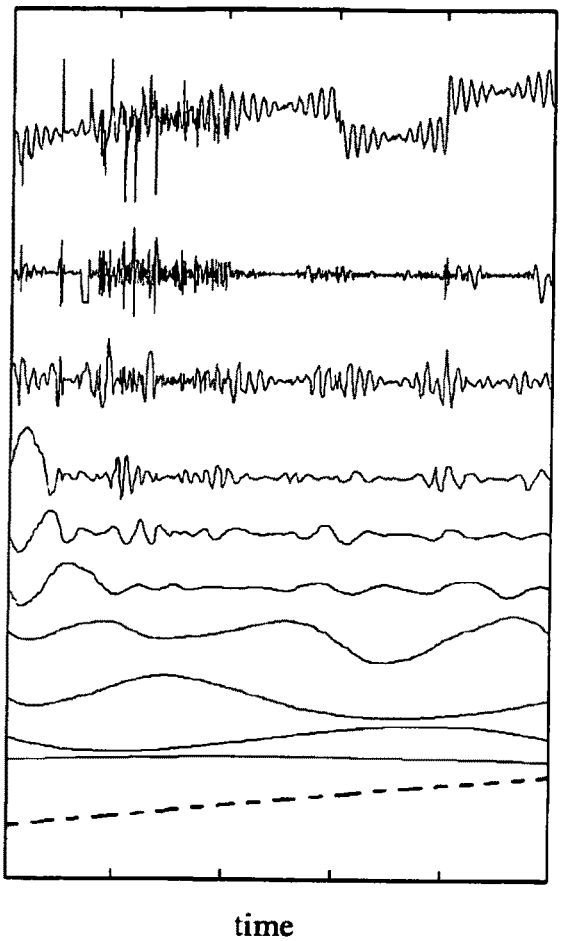
FIGS. 1a-1b are a comparison of the prior art method of EMD with the ITD as applied to a test signal.
Figure 1B:
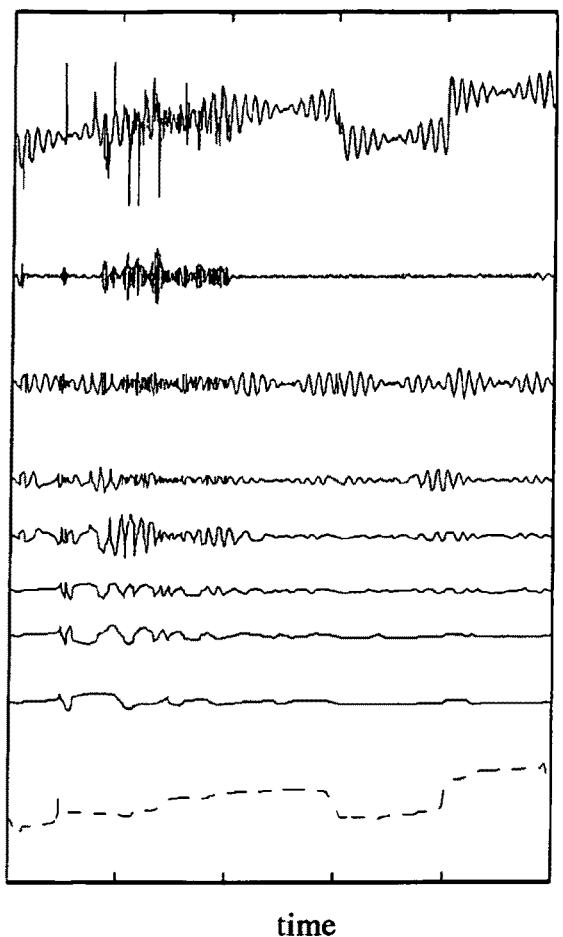
Figures 2A, 2B, 2C:
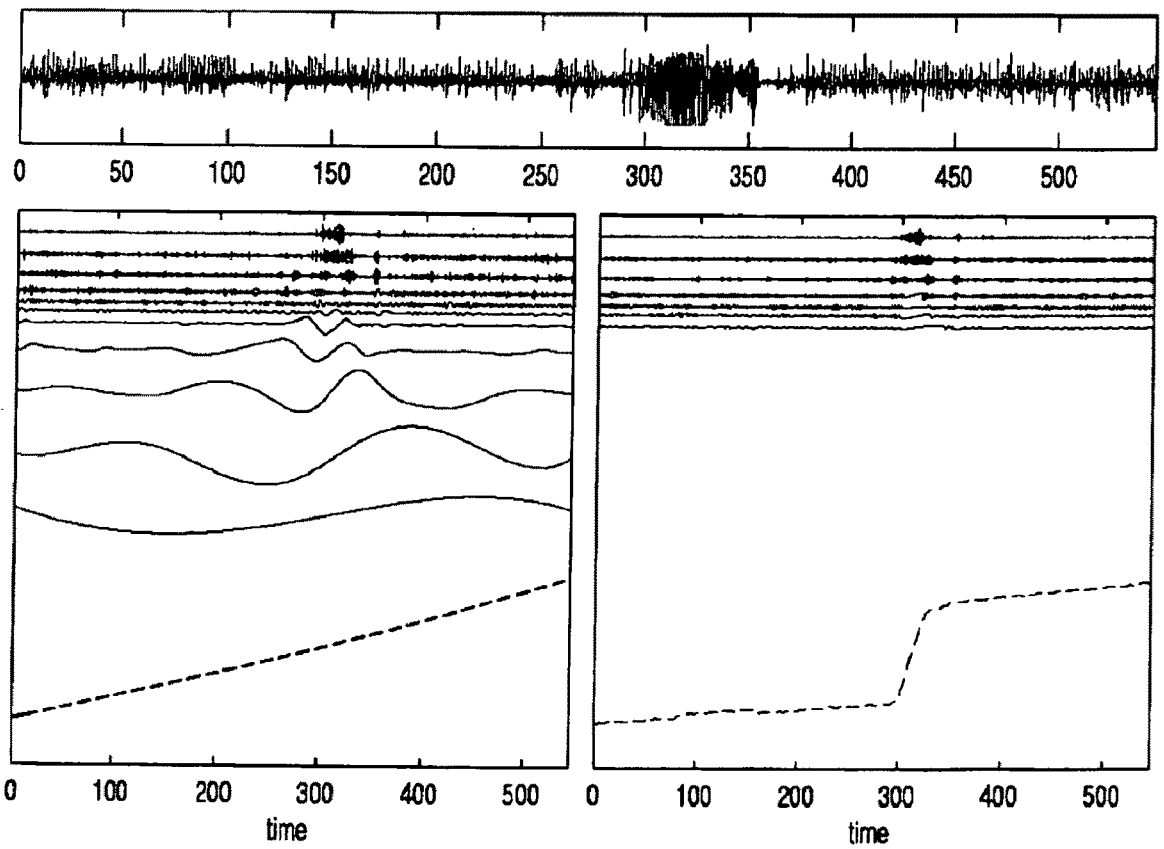

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Briefly stated, the present invention comprises a system for automated decomposition and analysis of signals of arbitrary type, origin, or timescale. It is able to accurately analyze complex signals that may be, for example, non-stationary, nonlinear, or both. The decomposition obtained by the system of the present invention is completely adaptive to the timescale of the analyzed signal (i.e., the input to the ITD), as determined by critical points of the input, such as local extrema, for example. This system can further analyze the signal components resulting from this decomposition to accurately quantify and localize various signal characteristics in time and frequency. Such signal characteristics include amplitude, wavespeed, phase, regularity, morphology, moments, energy, variance, skewness, and kurtosis, for example. The system can also apply such quantification and localization information as a new type of adaptive filtering, such as for noise removal, trend extraction, or decomposition of the input signal into different components, which have various desired properties. The ITD may be also used as a real-time measure of signal complexity or of information content as a function of time (or state) as determined by the number of extractable components and the energy content existent in each of them. For example, if a signal sample in a particular time window is decomposed by the ITD into five proper rotation components and a trend, and another time window of a (same or different) signal is decomposed by the ITD into nine proper rotation components and a trend, this indicates that the latter signal had more riding waves and thus may have carried more "information" than the former.

A. The ITD Method

The present invention includes an improved data analysis system for analyzing non-stationary or non-linear signals or data. This method is based on an algorithm, sometimes referred to herein as the Intrinsic Timescale Decomposition ("ITD") algorithm, which decomposes a signal into a set of components having sequentially lower frequency characteristics, according to the signal's intrinsic timescale as determined by local extrema, maxima and minima, or other critical points. These timescales are important in quantifying and analyzing an oscillating or fluctuating system. The separation process relies on a "signal-based," self-extraction, interpolation procedure used to identify and isolate individual waves (it can also separate parts of waves and/or sets of waves). This process is then iterated wherein each step separates out the smallest remaining timescale modes (i.e., highest frequency component) from the next successively larger timescale (i.e., lower frequency) baseline signals. The iteration steps are repeated until all modes have been extracted, with the last such mode corresponding to the largest timescale present in the signal, sometimes referred to herein as the monotonic signal "trend."

This decomposition process results in a set of signal components which, if recombined, would sum to the original signal and which possess a number of important properties that facilitate further signal analysis. These components contain constituent monotonic segments, each having fully preserved temporal information (including precise preservation of temporal location of all critical points of the original signal), that can be further decomposed, individually analyzed, or reassembled according to "wave speed," energy, morphology, probability of occurrence, temporal localization, or any other feature of the segment that may be quantified. These structural elements provide a basis for an expansion of the raw data in terms of the data itself. Most importantly, this basis is adaptive to arbitrarily fast or slow changes in the amplitude and/or timescale of the signal, which makes it ideally suitable for analysis of non-stationary data.

One skilled in the art will recognize that it may be desirable in certain applications for a system based on ITD, as an operator on functions, to be applied to a prior transformation of a given function and possibly followed by subsequent transformation (e.g., the inverse of the prior transformation). For example, a system based on ITD can be applied to a signal after first differentiating it one or more times, after which the results may be integrated the same number of times to produce the desired signal components. This technique can be especially useful in uncovering embedded high frequency signals that have a very small signal-to-noise ratio.

A Single Step of the Method of the Present Invention.

Figure 3:
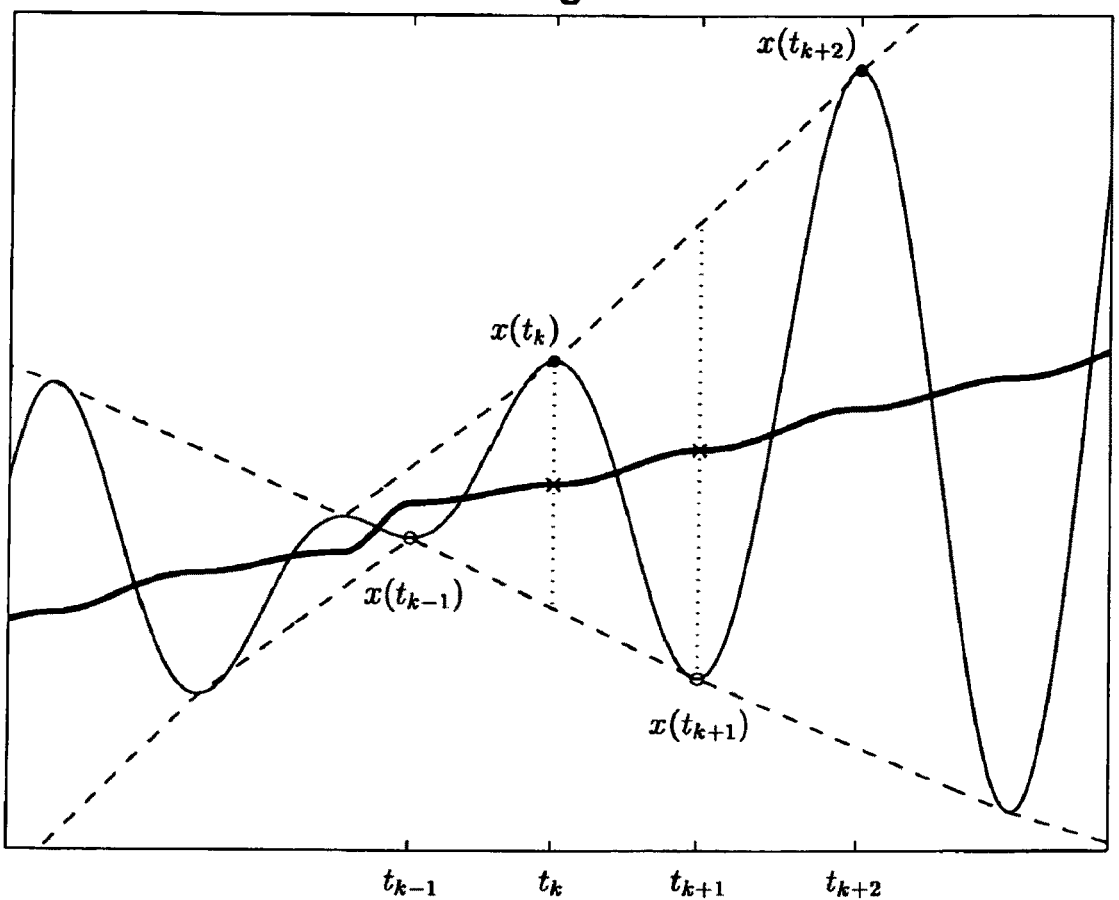
FIG. 3 is an illustration of ITD's extraction of the baseline from an input signal.

The system of the present invention for extracting the baseline can be applied to unevenly sampled data and preserves the locations of all critical points of the original signal, i.e., points at which some signal derivative of a given order is zero. FIG. 3 illustrates the procedure involved in a single step of the method.

The height of a single lobe of the signal can be defined as the length of a vertical line drawn from the $k^{th}$ extremum of the original signal, x(t), to the straight line connecting the extrema at $x(t_{k-1})$ and $x(t_{k+1})$, and is given by $$h_k = x(t_k) - \frac{(t_k - t_{k-1})x(t_{k+1}) + (t_{k+1} - t_k)x(t_{k-1})}{t_{k+1} - t_{k-1}},$$

where $t_k$ is the time of the $k^{th}$ extremum of x(t). The $k^{th}$ segment of the baseline is then defined by $$b(t) = c_k + d_k x(t) \text{ for } t_k \leq t \leq t_{k+1},$$

where $c_k$ and $d_k$ are constants. By requiring the values of the baseline at the points, $t_k$, to be $b(t_k) = x(t_k) - h_k/2$, then the total baseline can be constructed by concatenating these segments. The values of $c_k$ and $d_k$ can then be determined by equating the values of the baseline at the junction points, namely $$c_k + d_k x(t_k) = x(t_k) - h_k/2$$

and $$c_k + d_k x(t_{k+1}) = x(t_{k+1}) - h_{k+1}/2.$$

The first iteration extracts the component r(t)=x(t)−b(t), which contains the smallest timescale oscillations present in the original signal, leaving larger timescale modes behind in the remaining "baseline", b(t). The following properties then hold:

1. Each point $b(t_k)$ is either an extremum or inflection point with zero first derivative.
2. If $x(t_{k+1})-x(t_k)=(h_{k+1}-h_k)/2$, the $k^{th}$ segment (for $t_k \leq t \leq t_{k+1}$) of the baseline is a constant, $b(t)=c_k$.
3. The component, r(t), is a proper rotation. That is, each maximum of r(t) has a strictly positive value, and each minimum has a strictly negative value. In addition, each point $r(t_k)$ is either an extremum or an inflection point with a zero first derivative and the locations of all other critical points are preserved.

The baseline function and the extracted r(t) component are sometimes referred to herein as LF(t) and HF(t), respectively, to indicate their relative frequencies as "low" and "high," respectively. FIG. 3 illustrates the baseline signal obtained by this single-step of the method for a given input signal (x(t), also shown).

Iteration to Produce Multiple Levels

After the original signal has been decomposed into a high frequency component, HF(t), and a lower frequency baseline component, LF(t), this baseline component can be treated as the original signal and similarly decomposed in another level of the decomposition. Repetitive extraction of each successive baseline as the decomposition level increases converts: (i) more and more extrema into inflection points while making the lobes wider, and (ii) more and more of the data into long, monotonic segments. The remainder of such a repetitive baseline extraction will be the "trend," a monotonic segment with timescale equal to the length of original signal being analyzed.

The present invention, sometimes referred to herein as the Intrinsic Timescale Decomposition System, or the ITD system, includes an algorithm for decomposing an input signal into components with successively lower frequency characteristics, until finally one is left with either a monotonic signal trend if all modes have been extracted and no extrema of the resulting signal remains, or a signal of lowest relative frequency if the user limits the process to a fixed number of components which are reached before the monotonic trend has been obtained. The method overcomes all of the limitations of prior art methods and provides a significant advancement in the state-of-the-art.

In an application of the ITD method in order to decompose and analyze an input signal, the following steps are followed:

1. The input signal, x(t), is divided into two component signals: (i) a high frequency component signal, sometimes referred to herein as the HF component, that, adaptively at each point in time, contains the highest frequency information present in the signal, and (ii) a baseline component, sometimes referred to herein as the LF component or lower component, that contains all remaining, relatively lower frequency information of the signal. Thus, this first decomposition can be described by the following equation:

$$x(t)=HF(t)+LF(t).$$

2. The same process that was used to decompose x(t) is next applied to the LF(t) "baseline" component that resulted from the first level of decomposition. In other words, LF(t) is treated as if it were the original signal. By so doing, the LF(t) component is further subdivided into two more components: (i) a component comprising the highest frequency information of the LF(t) component, sometimes referred to herein as the HLF(t) component, and (ii) another component that contains all remaining relatively lower frequency information, sometimes referred to herein as the $L^2F(t)$ component. Thus, this second decomposition is described by the equation:

$$LF(t)=HLF(t)+L^2F(t).$$

3. Next, the $L^2F(t)$ component is similarly decomposed into $HL^2F(t)+L^3F(t)$, and the process is iterated on the successive $L''F(t)$ signals that contain successively lower and lower frequency information. At each step, the highest frequency information remaining is extracted or separated out. The process terminates when either an increasing or decreasing monotonic $L''F(t)$ segment has been obtained (sometimes referred to herein as the signal "trend"), or when the decomposition has been performed a desired number of times. The resulting decomposition can be summarized by the following equations:

$$\begin{aligned}x(t) &= HF(t) + LF(t) \\ &= HF(t) + HLF(t) + L^2F(t) \\ &= HF(t) + HLF(t) + HL^2F(t) + L^3F(t) \\ &= HF(t) + HLF(t) + HL^2F(t) + HL^3F(t) + L^4F(t) \\ &\ldots \\ &= HF(t) + HLF(t) + HL^2F(t) + HL^3F(t) + \ldots + HL^{n-1}F(t) + L^nF(t)\end{aligned}$$

As the decomposition is being performed, each new extrema in one of the components generates a new monotonic segment in the next lower frequency level, with properties that can be easily quantified and analyzed. As the original signal is decomposed by the method into components, it is simultaneously broken down into an ensemble of individual monotonic segments that are locked in time with the original extrema of the signal, i.e., these segments span the time interval between local extrema of the original signal These individual segments can be classified according to their own characteristics, allowing new and useful filtered signals to be constructed by assembling those segments, lobes, waves or groups of waves that have certain specific characteristics or properties. This process allows the invention to be applied to create an entirely new type of non-linear signal filter that is able to differentiate precise time-frequency-energy information simultaneously with many other important wave-shape characteristics at the single wave level in a computationally efficient manner.

Such decomposition, as provided by the ITD system of the present invention, has a number of special and desirable properties:

1. All of the $HL^kF(t)$ components are guaranteed to be "proper rotations," i.e., to have all strictly positive local maxima and all strictly negative local minima. Again, the need for a proper rotation decomposition is important in subsequent analysis to reliably determine instantaneous frequency of the $HL^kF$ components.

2. The decomposition is completely determined by the input signal. It is fully adaptive and local in time. Moreover, it is highly computationally efficient, each step consisting only of comparisons to determine extrema, and followed by a piece-wise linear transformation of buffered data between successive extrema to produce the desired signal components.

3. The ITD procedure completely preserves temporal information in the signal. All of the critical points of the $HL^kF$ components (i.e., the points in time at which their local maxima, local minima, inflection points, etc., occur) coincide precisely with the critical points of the original signal.

4. The ITD method, as exemplarily implemented in the code contained in the Computer Program Appendix hereof, can be performed in real time to simultaneously produce output as the information becomes available, thereby eliminating all boundary effects or windowing effects other than initial startup effects which last at a particular level only until two extrema are obtained by the low-frequency component at the prior level, i.e., until full wave information becomes available at these lower frequencies. The online implementation allows the method to resolve arbitrarily low frequency information present in the signal and, thus, all frequency information present in the signal.

The ITD method and apparatus of the present invention has broad and important applicability to analysis of many different types of signals, including, but not limited to, geophysical signals, seismic data, thermal signals such as sea surface temperature, radiometer signals, environmental signals, biologic signals such as brain waves or heart signals, proteins, genetic sequences or other data, morphometrics, telecommunications signals, speech or other acoustic signals, crystallographic, spectroscopic, electrical or magnetic signals, object trajectories or other physical signals, structural vibrations or other signals indicative of structural integrity (e.g., movement of bridges or buildings) such as resonant frequencies of structures, power signals including those in circuits, and signals arising in finance such as stock and bond prices. The method is designed for application to signals of arbitrary origin, timescale, and/or complexity. It can also be useful in fusion of data obtained from different sensors, since underlying correlated signals may be uncovered and time-locked together with the method.

Although the ITD system can incorporate a sifting procedure at each level of decomposition, it is not required. The desirable "proper rotation" property of the components, guaranteed by the ITD system, is attained at each level in a single, highly computationally efficient, first step. The only purpose for applying such a sifting procedure would be to smooth the amplitude envelope of the components. While this may be desirable for certain applications, it must be performed with care, with the understanding that the sifting process may reduce or even eliminate the instantaneous information that the ITD otherwise provides without any sifting procedure.

Some advantages over the prior art provided by the present invention include:
(a) applicability for analyzing non-stationary and/or non-linear signals;
(b) ability to operate in real-time due to its computational simplicity, recursive nature, elimination of need for sifting, and absence of significant end effects;
(c) ability to adapt to any timescale and to use complete signal information, including all critical points such as inflection points and zero crossings and not just local extrema, thereby allowing weak signals embedded in stronger signals to be extracted;
(d) ability to provide precise time-frequency-energy localization, either instantaneously via the Hilbert transform or on other timescales, such as the inter-extrema timescale, the inter-critical point timescale, etc.;
(e) ability to interpolate adjacent critical points using the signal itself, sometimes referred to as the self-extraction property. The ITD system is 'well-behaved' even if the data is unevenly sampled or if it is discontinuous. This translates into the ability to preserve intact phase and morphology characteristics of the signal; and
(f) ability to estimate the information content or complexity of the signal at multiple time and spatial scales.

The characteristics that make the ITD extremely well-suited for the analysis of nonlinear or non-stationary signals and which fundamentally differentiate it from prior art systems are:
(a) The ability to operate in real-time, due to its computational simplicity (including the lack of need for sifting, and the unique ability to generate a proper rotation HF component in one step) and the absence of significant end effects.
(b) The ability to adapt to any timescale and to use complete signal information, including all critical points (e.g., inflection points and zero crossings) and not just local extrema.
(c) The ability to interpolate adjacent critical points using the signal itself (self-extraction property), instead of cubic splines, which cause instability (overshooting or undershooting) by generating spurious extrema or by shifting or amplifying existing ones. Additionally, spline interpolation does not work well when there are sudden changes in the timescale of the signal, a common phenomenon in analysis of non-stationary signals.
(d) The ability to extract single modes in one step, which makes it highly computationally efficient.

These technical differences translate into important additional advantages:
(a) There is absence of significant "end effects."
(b) The ability to extract weak signals, embedded in stronger ones because the ITD scaling is not exclusively given by extrema,
(c) The ITD is "well-behaved" even if the data is unevenly sampled or if it is discontinuous.

Although the aforementioned advantages, well-suited characteristics, and technical differences are described in this iteration sub-section, it is to be understood that these advantages, well-suited characteristics, and technical differences are similarly applicable to online ITD, obtaining time-frequency distribution of signal energy and obtaining instantaneous phase and frequency, analyzing single waves to create new methods of filtering and compression for signals of arbitrary origin, and general data analysis as described in the following sub-sections hereof.

B. Online ITD

The ITD method has been recursively implemented for online signal analysis. Software, written in C and in MATLAB® languages, is provided in the Computer Program Appendix hereof. The online version of the computer code is designed to run continuously forward in time and to process input signal information as it is obtained, with minimal computational expense and minimal time delay. The software detects extrema in a digital input signal as soon as they occur, and immediately computes the monotonic segment of the corresponding low and high frequency components on the time interval from the most recent prior extrema to the current, newly found extrema using the procedure explained herein. The monotonic segment of the LF component is then concatenated with the existing signal at the decomposition level obtained to that point, and the most recent value of the component is checked to determine whether an extrema has been found at that level. If so, the appropriate monotonic segment of the $L^2F$ component is then computed along with the corresponding segment of the HLF component. The extrema-triggered process continues down through each level until the low-frequency monotonic segment simply results in a lengthening of the monotonic segment rather than generating a new extrema at that level. The delay in obtaining information at any given level is simply equal to the time until the next extrema is obtained at that frequency level. Thus, information is available on the same timescale as that at which the input signal is fluctuating, as determined by the time between successive extrema.

The software requires three signal extrema to begin the decomposition at the first level. The ability of the method to constrain edge-effects to the time period prior to the first two extrema allows it to be interpreted as a start-up transient in information generation, which is common in automated signal analysis. From the time of occurrence of the third extrema in the raw signal forward, or the $L^nF$ component being decomposed in the case of higher levels of decomposition, the remaining data at that level is absolutely free from edge-effects.

Figure 4A:
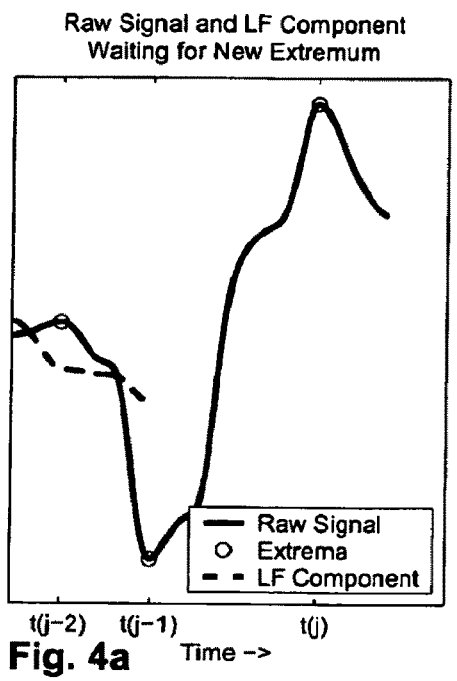
FIGS. 4a-4d are illustrations of the steps of the online ITD method.
Figure 4B:
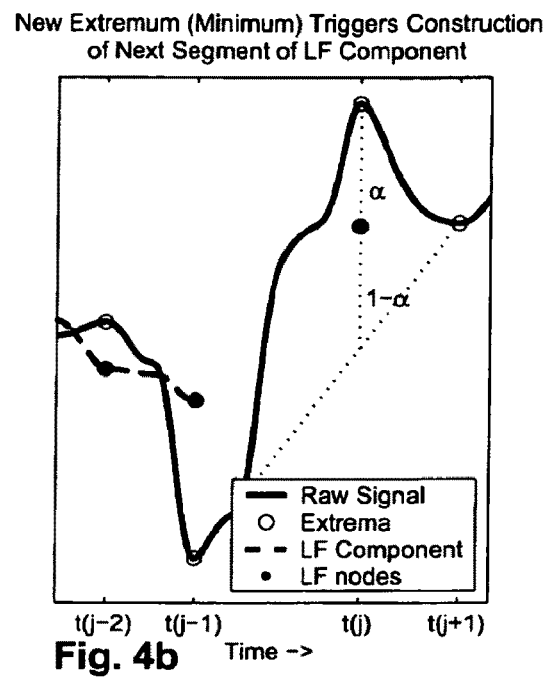
Figure 4C:
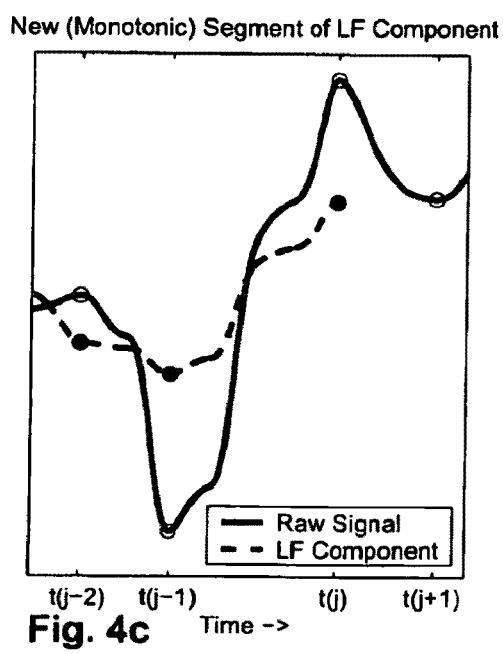
Figure 4D:
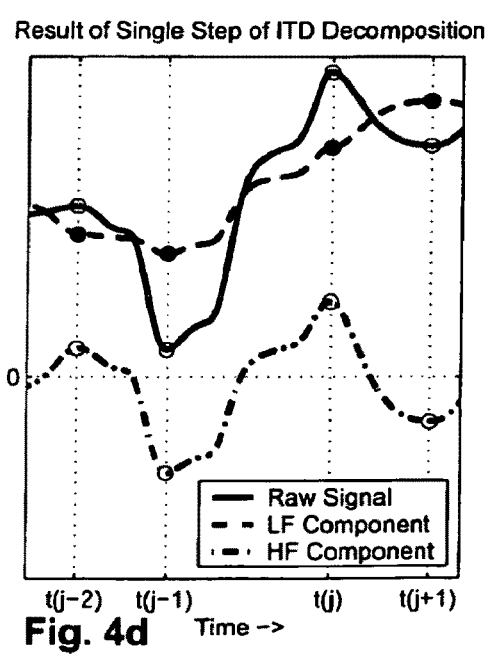

FIGS. 4a-4d illustrate the procedure followed by the online ITD system. In FIG. 4a, the input signal to be decomposed is shown in solid lines with extrema indicated by circles. The baseline component, computed in time up to the local minimum extrema at time $t(j-1)$ is shown in dashed lines. The system is buffering each new input signal value on the solid curve until such time as a new extrema is detected at time $t(j+1)$. The detection of the new extrema triggers computation (via the ITD step algorithm) of the monotonic baseline segment for values of t between $t(j-1)$ and $t(j)$. First, a new baseline node is computed (see solid point at $t(j)$ in FIG. 4b), and the input signal itself over that interval is linearly transformed to form the monotonic baseline function over that interval (see dashed red curve between $t(j-1)$ and $t(j)$ in FIG. 4c). The low frequency baseline component segment is then immediately subtracted from the input signal to generate the corresponding high frequency component on the $[t(j-1), t(j)]$ interval. The procedure continues, with each new extrema triggering a similar portion of the decomposition on the time interval between adjacent extrema. See FIG. 4d for an illustration of resulting baseline and high frequency components for this example, along with the original signal being decomposed. Note that: (i) the high frequency component has all positive maxima and all negative minima (i.e., it is a "proper rotation"), and (ii) the method is iterated, applying this decomposition procedure to each resulting baseline component in a manner that is similarly triggered each time the component to be decomposed has a new extrema.

C. Application of the ITD to Obtain the Time-Frequency Distribution of Signal Energy and New Methods for Obtaining Instantaneous Phase and Frequency.

Application of the ITD to an input signal results in a decomposition that consists of a set of proper rotation components of successively lower relative frequencies, along with a monotonic signal trend. The proper rotations are ideally suited for subsequent analysis to determine the time-frequency-energy ("TFE") distribution of the original signal. This can be accomplished, e.g., by using the Hilbert transform if TFE information is sought at every data point (i.e., with temporal precision equal to the signal sampling rate). However, the present invention also includes methods for instantaneous phase angle and instantaneous frequency computation that do not require use of the Hilbert transform. These methods are "wave-based," i.e., they define the instantaneous frequency in a piece-wise manner, each piece corresponding to the time interval between successive uperossing of a proper rotation and using only information about the single wave of the proper rotation occurring during that period and guarantee a monotonically increasing phase angle when applied to proper rotation components, whereas numerical computations of instantaneous phase using the Hilbert transform do not always result in this highly desirable property. Instantaneous frequency can then be obtained from the time derivative of the instantaneous phase angle. Monotonically increasing phase angles result in instantaneous frequencies that are never negative. By contrast, in Hilbert transform-based numerical computations of instantaneous phase angle, angle decreases and corresponding negative instantaneous frequencies occasionally occur, along with related phase-unwrapping jumps by $2\pi$ multiples. By contrast, the first embodiment of the method described herein (i.e., the "arcsine approach") produces instantaneous phase angles that do not suffer from these problems and, though not necessarily identical to those obtained via the Hilbert transform, provide a reasonable and useful alternative. The arcsine approach coincides with the Hilbert transform result for mean-zero trigonometric functions and provides more desirable results in cases when the Hilbert transform leads to negative frequencies and/or phase-unwrapping jumps. Moreover, the Hilbert transform approach suffers from boundary effects that are overcome by the present invention. One skilled in the art will also appreciate that while the Hilbert transform and the inventions described herein may be applied to non-proper rotation signals, the concept of instantaneous phase angle and instantaneous frequency are meaningful and avoid ambiguity only when applied to proper rotation signals.

The first embodiment of the method for instantaneous phase angle computation obtains the phase angle, $\theta(t)$, from the signal $x(t)$ for one full wave (i.e., the portion of the signal between successive zero up-crossings) at a time. The instantaneous phase angle is obtained using the arcsine function applied to the positive and negative signal half-waves (separated by the zero down-crossing of the wave) after amplitude normalization, as follows:

$$\theta(t) = \begin{cases} \sin^{-1}\left(\frac{x(t)}{A_1}\right) & t \in [t_1, t_2] \\ \pi - \sin^{-1}\left(\frac{x(t)}{A_1}\right) & t \in [t_2, t_3] \\ \pi - \sin^{-1}\left(\frac{x(t)}{A_2}\right) & t \in [t_3, t_4] \\ 2\pi + \sin^{-1}\left(\frac{x(t)}{A_2}\right) & t \in [t_4, t_5] \end{cases}$$

where $A_1>0$ and $A_2>0$ are the respective amplitudes of the positive and negative half-waves between the successive zero up-crossings, $t_1$ and $t_5$, $t_2$ is the (first) time of the maxima ($A_1$) on the positive half-wave, $t_3$ is the zero down-crossing time, and $t_4$ is the (first) time of the minima ($-A_2$) on the negative half-wave. Incomplete waves at the beginning and/or end of a proper rotation component, i.e., data prior to the first zero up-crossing or after the last zero up-crossing, may be treated according to this definition as well over the appropriate sub-interval of $[t_1, t_5]$. According to this phase angle definition, the phase angle is zero at every zero up-crossing, $\pi/2$ at the local maxima of the wave, $\pi$ at each zero down-crossing, and $3\pi/2$ at each local minima. In the on-line ITD, the evolution of the phase angle over any monotonic segment of a proper rotation can be computed between times of successive extrema as soon as the right-hand extrema is determined and the segment has been obtained from the ITD decomposition.

The second embodiment of the method for instantaneous phase angle computation is similar to the first, in that it is based on the progression of the proper rotation through each successive full wave, but is designed to provide an even more computationally efficient alternative. In this embodiment, the phase angle is computed for each wave of the signal as follows:

$$\theta(t) = \begin{cases} \left(\frac{x(t)}{A_1}\right)\frac{\pi}{2} & t \in [t_1, t_2) \\ \left(\frac{x(t)}{A_1}\right)\frac{\pi}{2} + \left(1 - \frac{x(t)}{A_1}\right)\pi & t \in [t_2, t_3) \\ \left(-\frac{x(t)}{A_2}\right)\frac{3\pi}{2} + \left(1 + \frac{x(t)}{A_2}\right)\pi & t \in [t_3, t_4) \\ \left(-\frac{x(t)}{A_2}\right)\frac{3\pi}{2} + \left(1 + \frac{x(t)}{A_2}\right)2\pi & t \in [t_4, t_5] \end{cases}$$

This approach obtains the instantaneous phase angle via linear interpolation of the signal value between zero and its value at an extrema. Phase angles that are computed using this second method may deviate more significantly from those obtained via the Hilbert transform than those derived from the first embodiment. However, it will be appreciated that either embodiment may be more useful than the other (or Hilbert transform-based analysis) for certain applications, such as measuring certain types of synchronization between two proper rotations. Which approach is better depends upon such factors as the weights given to physical meaningfulness of the instantaneous frequency and to the computational expense of the procedure.

If temporal information on the timescale of the individual waves present in the decomposed components is all that is required, as opposed to instantaneous information on the time-scale of the sampling rate as discussed above, TFE information may be obtained through quantification of the size/energy and duration/frequency/wavespeed of the individual waves of each proper rotation component. Alternatively, one skilled in the art will appreciate that the ITD method allows the use of other temporal segmentation for the purpose of TFE distribution construction, such as, e.g., that determined by component critical points, individual monotonic segments, or component "half-waves" as partitioned by zero-crossings. The results of any of these approaches may be further smoothed as desired for visualization and analysis purposes using any number of standard techniques well known to those skilled in the art.

Figure 5F:
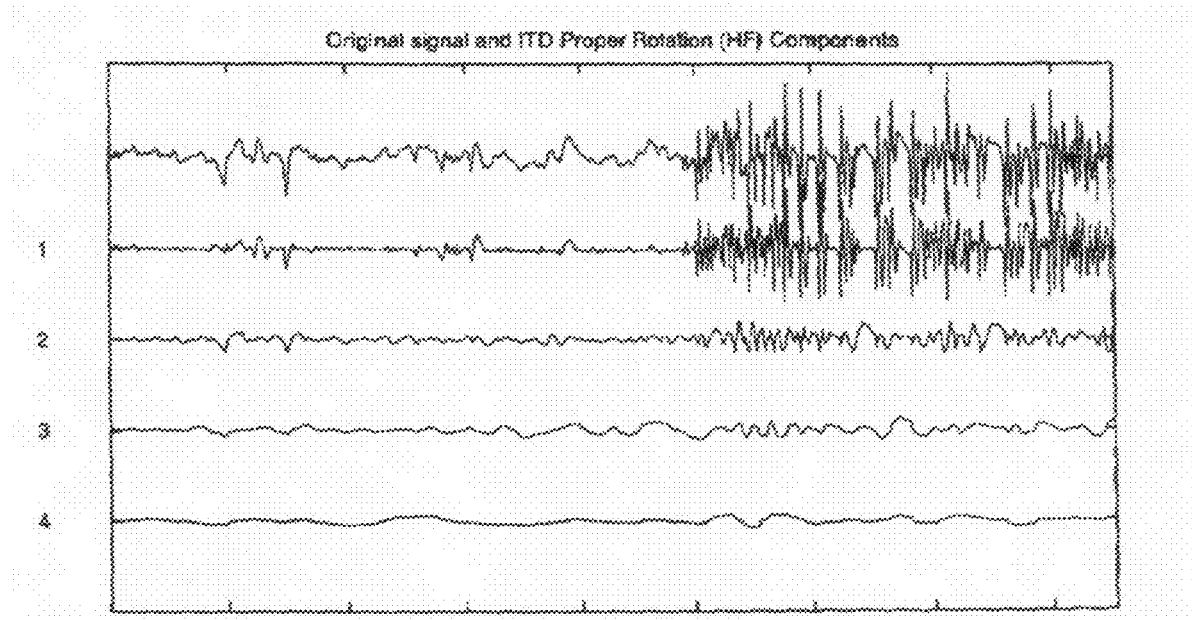
Figure 5G:
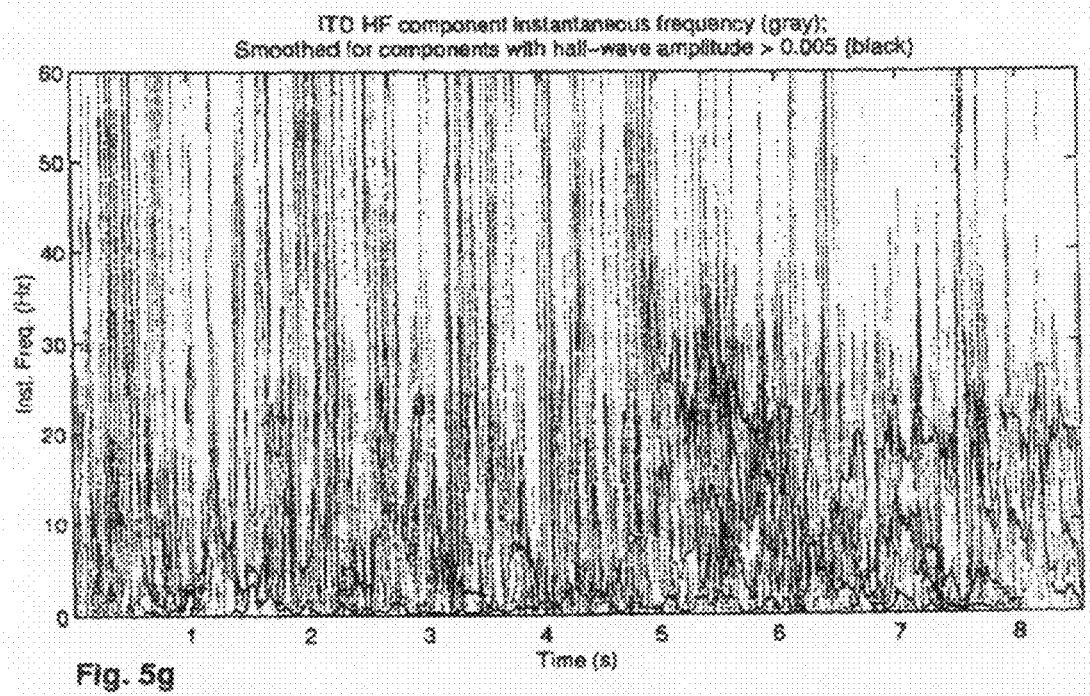
Figure 5H:
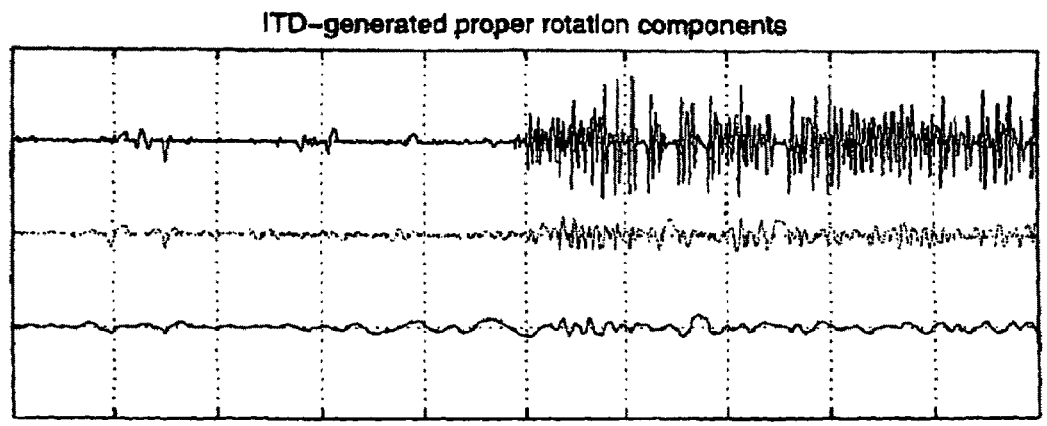
Figure 5I:
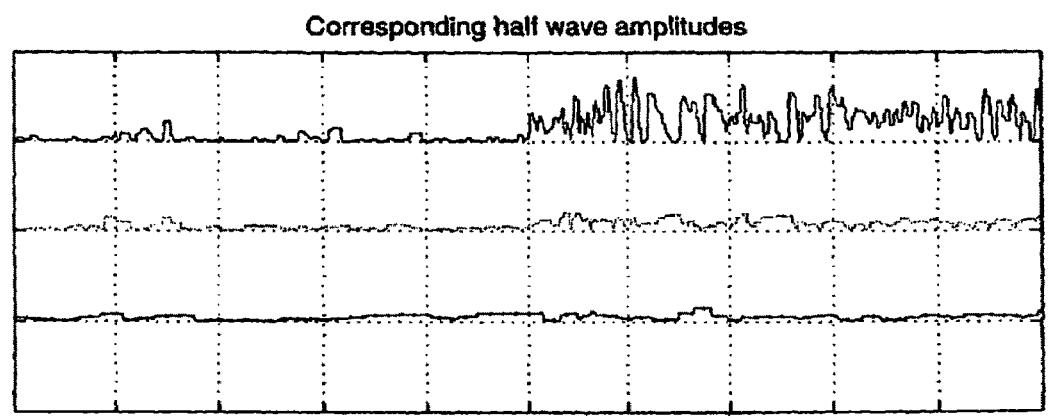
Figure 5J:
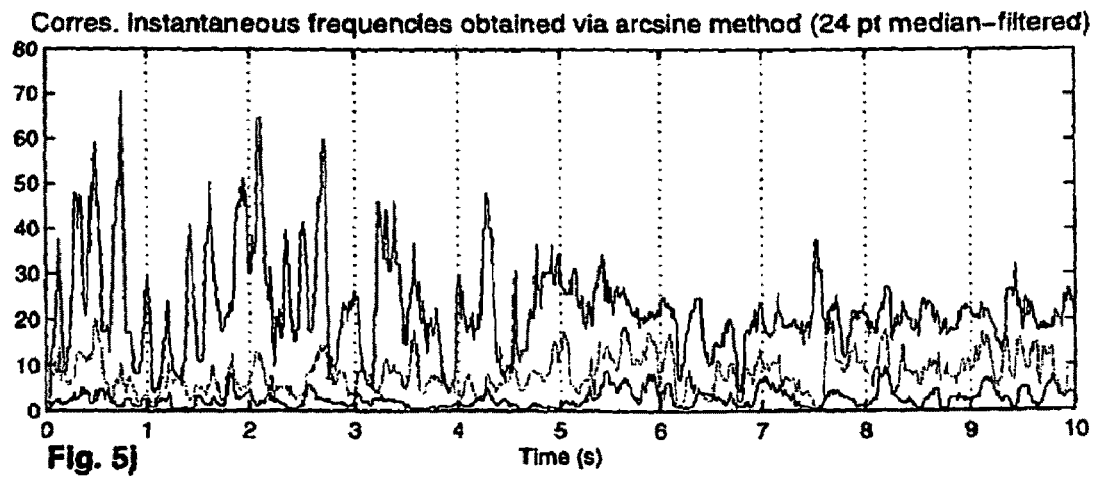

FIGS. 5a-5j demonstrate how the ITD may be applied to determine a TFE distribution of a sample signal and compares its performance to prior art methods of Fourier analysis and wavelet analysis for this task. FIG. 5a contains a sample signal. FIGS. 5b-5c contain the TFE distribution of the signal obtained via windowed Fourier analysis. Note the rectangular grid of TFE information naturally derived from this transform and the trade-offs between good temporal but poor frequency localization (as shown in FIG. 5b), and poor temporal but good frequency localization (as shown in FIG. 5c). Darker regions correspond to those with higher power throughout this Figure. It is impossible to simultaneously improve both temporal and frequency localization of energy. Quantification is performed in this Fourier analysis by sequential time windows with a predetermined segmentation of the signal that is not determined in any way by the signal changes (e.g., local extrema). FIG. 5d illustrates the TFE distribution for the same input signal that is obtained using the fast wavelet transform, sometimes referred to herein as the FWT. Note the dyadic grid of TFE information naturally derived from this transform. The FWT has the ability to localize higher frequency information on shorter time scales and lower frequency information on longer timescales, but still suffers from predetermined temporal segmentation and inaccuracies in both temporal and frequency localization. These are due in part to the bleeding of signal energy across different levels of resolution in the wavelet transform and are attributed in large part to the temporal and frequency bins that are predetermined by the choice of basis and not by the signal under study. FIG. 5e shows the ITD-based TFE distribution for the same signal, illustrating the significant advance in time-frequency localization provided by the algorithm of the subject invention. Each displayed line segment's start and end points correspond exactly to the start and end of an actual wave in an ITD proper rotation component and the line segment shading is determined by the amplitude of the corresponding wave (darker indicates greater amplitude). Since the ITD automatically decomposes the input signal into a set of proper rotations and a monotonic trend, the instantaneous phase angles for each proper rotation component can be obtained via the Hilbert transform or the invention's alternative approaches described herein to obtain the corresponding instantaneous frequencies. FIG. 5f shows the original signal and the first four HF components obtained by the ITD. FIG. 5g shows the instantaneous frequency curves (in light gray when instantaneous power is insignificant, i.e., below $2 \times 10^{-5}$) corresponding to each of the HF proper rotation components (as shown smoothed and solid black) when instantaneous power is non-negligible, i.e., above 0.005, to illustrate this process. The curves in FIG. 5g were obtained using the arcsine-based method for instantaneous frequency computation and were smoothed using a 0.1 second median filter to enhance visualization. FIG. 5h shows the first three proper rotation components obtained by application of the ITD to the signal of FIG. 5a. FIGS. 5i and 5j show the half-wave amplitudes and (smoothed) instantaneous frequencies for each component obtained via the arcsine-based method for instantaneous phase and instantaneous frequency determination (linestyles are the same as that of the corresponding proper rotation components). As expected, the instantaneous frequencies of each component decrease at each point in time as the level increases, but the actual frequency values are determined solely by the signal and not predetermined in any manner.

D. Application of the ITD and Single Wave Analysis to Create New Methods of Filtering and Compression for Signals of Arbitrary Origin.

Figure 6F:
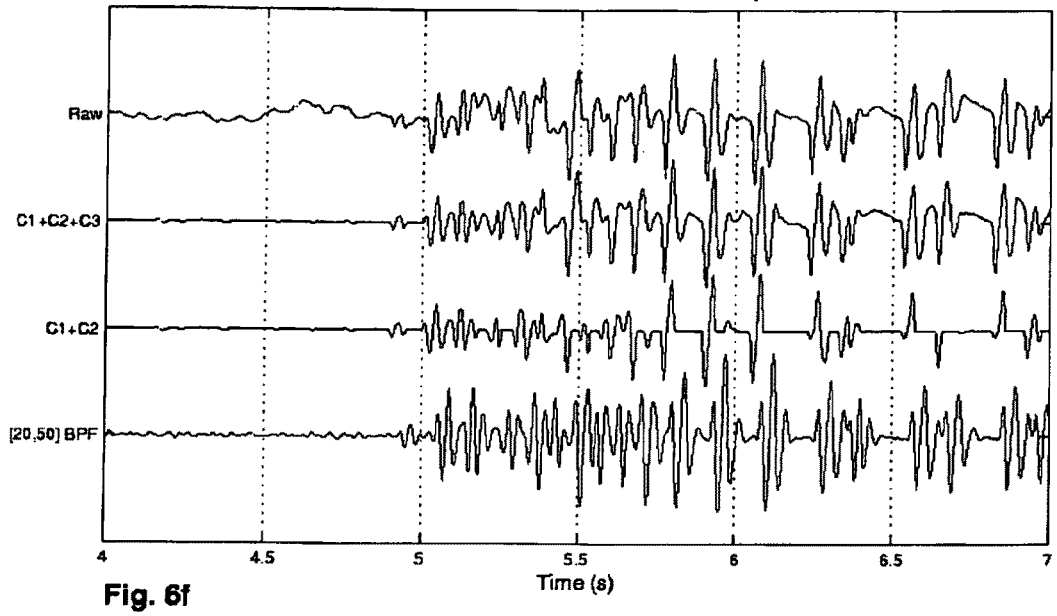
Figure 6G:
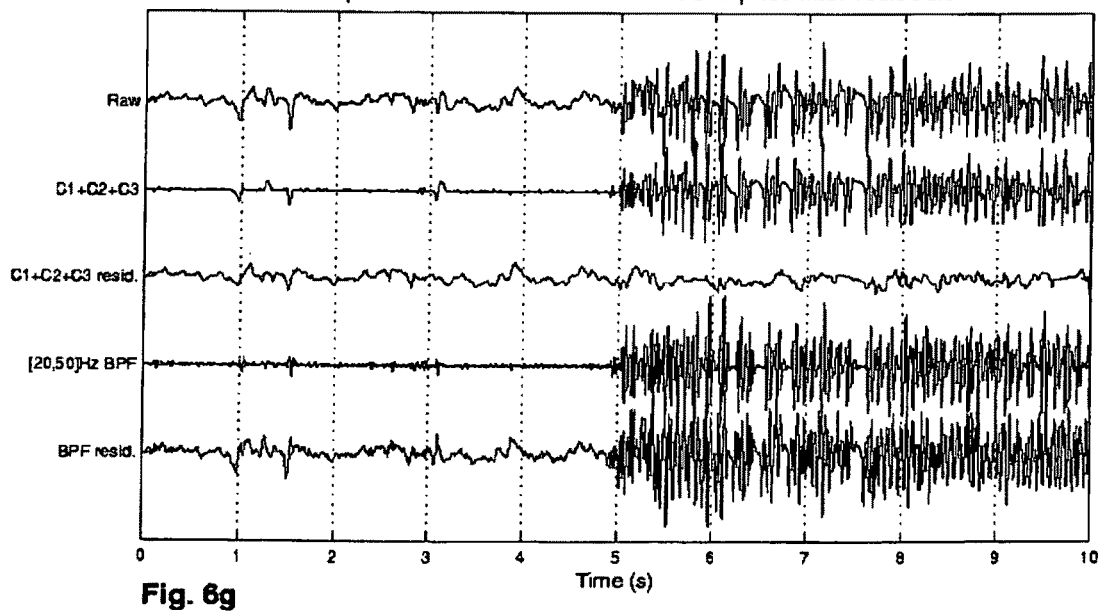

The ability of the ITD to decompose online any input signal into a set of one or more component signals which have the proper rotation property makes it an ideal first step of a two-step process resulting in a powerful and unique new method for nonlinear signal filtering. In particular, as each monotonic segment is computed within one or more decomposition levels, features of the segment can be analyzed and quantified. For example, the amplitude and duration of the segment may be simply computed from the extrema, i.e., the starting and ending points of the segment. One skilled in the art will appreciate that more detailed features such as the time-weighted feature density of the segment and associated properties such as its average or median value, its variance, skewness, distance from a template or reference density, etc., may also be quantified for each segment. Individual segments may then be classified according to the values of theses quantified features. A filtered signal can then be constructed by adding together (i.e., superimposing the segments while preserving the time intervals on which each occurred) only those segments that satisfy certain constraints applied to their quantified features. For example, one may construct a signal using only those ITD-created monotonic segments with durations that, using the data sampling rate, correspond to wavespeeds between $f_{min}$ Hz and $f_{max}$ Hz, and with absolute amplitudes of at least $A_{min}$, e.g., in excess of the $75^{th}$ percentile of amplitudes for all segments with the required duration. In this example, the output can be essentially interpreted as extracting the waves in the input signal that are in the $f_{min}$–$f_{max}$ frequency band and which have larger amplitudes than $A_{min}$. Such uses would bear a strong resemblance to the commonly used Fourier-based band-pass filtering, but would avoid the phase-shifting and waveform distortion drawbacks, while adding the amplitude differentiation capability. In FIGS. 6a-6g, this concept is illustrated when applied to the same input signal used in FIG. 5a (also shown again in FIG. 6a). After the TFE distribution is computed, the absolute amplitude and duration/wavespeed of each individual wave are obtained. FIGS. 6b-6c show the one-dimensional (marginal) densities of these two features along with vertical discriminator in solid lines that were selected for purposes of illustrating the capabilities of this method. FIG. 6d shows the (absolute amplitude, wavespeed) ordered pairs for each segment. Discriminators of pairs with wavespeed less than 20 Hz, between 20 Hz and 50 Hz, and greater than 50 Hz are applied, along with a discriminator of amplitude exceeding 0.01 mV. Feature vector pairs (i.e., points in FIG. 6d) falling into certain specific regions of the two-dimensional feature range are classified according to the region in which they belong. FIG. 6e displays three filtered components constructed using only those segments with points in specific regions (corresponding to three of the regions in FIG. 6d). Component one, $C_1$, is the output of a filter that contains the signal reconstructed using only those waves that have absolute amplitude exceeding 0.01 mV and wavespeed between 20 Hz and 50 Hz. Component two, $C_2$, is the output of a filter that contains the signal reconstructed using only those waves that have absolute amplitude less than 0.01 mV and wavespeed between 20 Hz and 50 Hz. Component three, $C_3$, is the output of a filter that contains the signal reconstructed using only those waves that have absolute amplitude exceeding 0.01 mV and wavespeed below 20 Hz. The output obtained by combining some of these components (i.e., $C_1+C_2+C_3$ and $C_1+C_2$) are shown in FIG. 6f, along with the output of a traditional, linear, [20, 50] Hz. band-pass digital filter provided for comparison. The extrema-preserving properties of this new type of filter are evident in this FIG. 6f. FIG. 6g again compares an output available by using the ITD filter in comparison to the same linear band-pass digital filter, but does so on a slightly larger timescale (10 seconds). The residual signals obtained by subtracting the filtered outputs from the original signal are also shown, to illustrate the ability of the ITD based signal to more completely decompose the raw input signal into what may be interpreted as abnormal and normal components present in the raw signal.

Since the relative starting time of each segment can also be considered as a segment feature, temporal relationships between segments can be analyzed (in addition to other features) to determine which segments to include in construction of the filtered signal output. This allows much more sophisticated pattern recognition techniques to be incorporated into the second step of this filtering process. Of course, there may be multiple classes of features and an input signal may be decomposed by this ITD-based nonlinear filter into a multitude of output components. One skilled in the art will also appreciate that adaptation techniques used in conventional digital filtering may be equally well employed in this new setting to produce adaptive ITD-based nonlinear filters. Such techniques include, for example, cluster-analysis applied to segment features in order to determine recurring patterns or underlying signal dynamics that may exist in the input signal and which the filter may be designed to separate and illuminate. In addition to, or as an alternative to single segment-based feature analysis, one may perform the analysis on whole "waves" consisting of pairs of (i.e., consecutive) monotonically increasing and decreasing segments or waves defined by inter-zero-up-crossings of any of the proper rotation components.

Another example that illustrates the power of the invention for signal filtering and analysis is provided in FIGS. 7a-7h. In these Figures, we demonstrate how the ITD-based filtering method may be applied to differentiate between two types of waves that have significantly overlapping spectral characteristics and to decompose a raw signal that is a combination of these two types of waves into components that preserve temporal location of extrema and critical points in the raw signal. Overlap between the power spectral densities of an underlying signal and superimposed noise is one of the more difficult problems in signal analysis and detection, with numerous applications. FIG. 7a illustrates the mix of two alternating signals, one a 9 Hz cosine wave with an increasing linear trend and the other a 9 Hz sawtooth wave. The signals were added to create a raw test signal for use in this example. FIG. 7b shows the power spectral density estimates for each of the two signals, clearly illustrating the significant overlap in the band around 9 Hz. FIG. 7c shows the proper rotation components and monotonic trend obtained via application of ITD to the original combined signal. FIGS. 7d-7e illustrate the result of applying single wave analysis to examine various features of individual waves obtained by the ITD decomposition. FIG. 7d shows the ratio of individual wave peak to mean signal value, while FIG. 7e shows a plot of wave skewness plotted versus wave kurtosis. A sample discriminator in dashed linestyle is also shown to illustrate the result of feature classification as applied to these quantified waveform features. FIG. 7f shows the output of the ITD-based filter that retains only those waves with peak-to-mean value ratio exceeding 1.65. The corresponding residual signal, i.e., the original signal minus the filter output signal, is also shown and illustrates that peak-to-mean value ratio discrimination of ITD-produced proper rotation waves allow reconstruction of a filter output that nearly perfectly decomposes the original signal into its constituent components while retaining precise temporal information regarding, e.g., extrema location. FIG. 7g shows the output of the ITD-based filter that retains only those waves with skewness-kurtosis pairs above the dashed discriminator line, along with the corresponding residual signal. This example illustrates how this new filter method may be easily configured to decompose an input signal into components with more complex criteria, such as "cutting off the tops of all riding sinusoidal waveforms while retaining every other signal component" as is done here. FIG. 7h shows the same signals as in FIG. 7g but zooming in to the time interval between t=9 and t=13 to see details of the filter output.

Another useful capability of the invention involves use of the ITD and single wave analysis to provide a means for signal compression. Since the ITD proper rotation components preserve extrema and critical points of the original signal, single-wave analysis-based compression and subsequent reconstruction are also able to accurately preserve the extrema and/or critical points deemed significant by the user. The user may throw away all individual monotonic segments of signal that are determined to be insignificant, according to automated analysis of a set of segment features and retain only those segments that are of interest for later use in reconstruction. Moreover, utilizing cluster analysis of waveform shapes, shapes of their derivatives, clustering analysis of quantifiable signal features, or classification of individual waveform segments into a small set of 'cymemes' or template waves such as, for example, half sine waves with amplitude and frequency matching the single waves, allows for significant compression of non-stationary signals.

E. Application of the Above Methods to General Data Analysis

One skilled in the art will recognize that the ITD method does not actually require the input data to be a time series or "signal" in the strict sense of the word, i.e., a sequence of data indexed by time. The method is sufficiently flexible to be applied to any set of numerical data that is a function of a real-valued variable, i.e., one that satisfies a "vertical line test." The index that is typically interpreted herein as a time index could instead just refer to the aforementioned real-valued variable. For example, in any list or sequence of numbers, the variable "t" may be assigned natural number values, i.e., 1, 2, 3, ..., and interpreted simply as the index into the list of data. The fact that the ITD does not require uniform spacing of the data in time also allows obvious generalization of the method to other types of data besides time series.

Figure 8A:
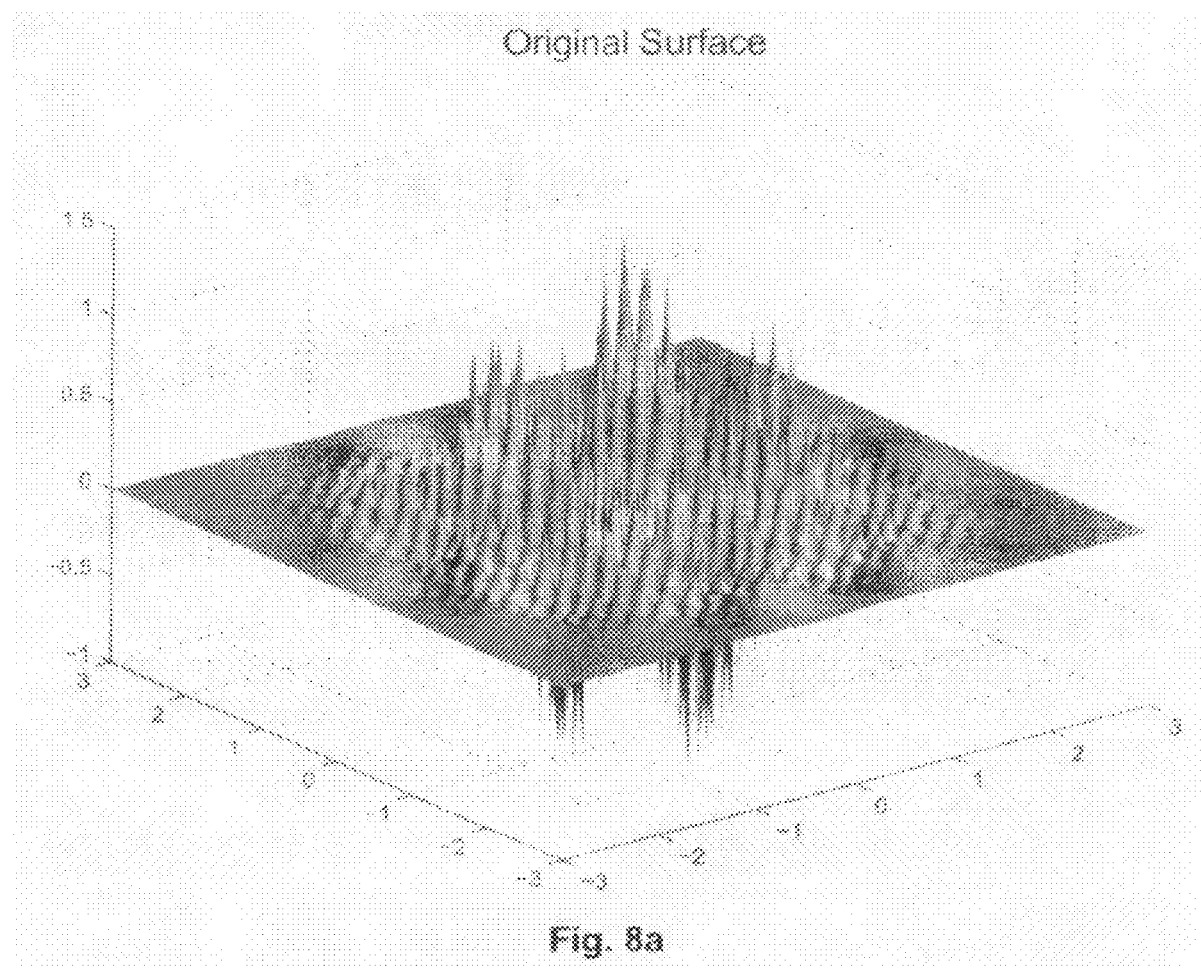
FIGS. 8a-8c are illustrations of ITD applied to multidimensional data.
Figure 8B:
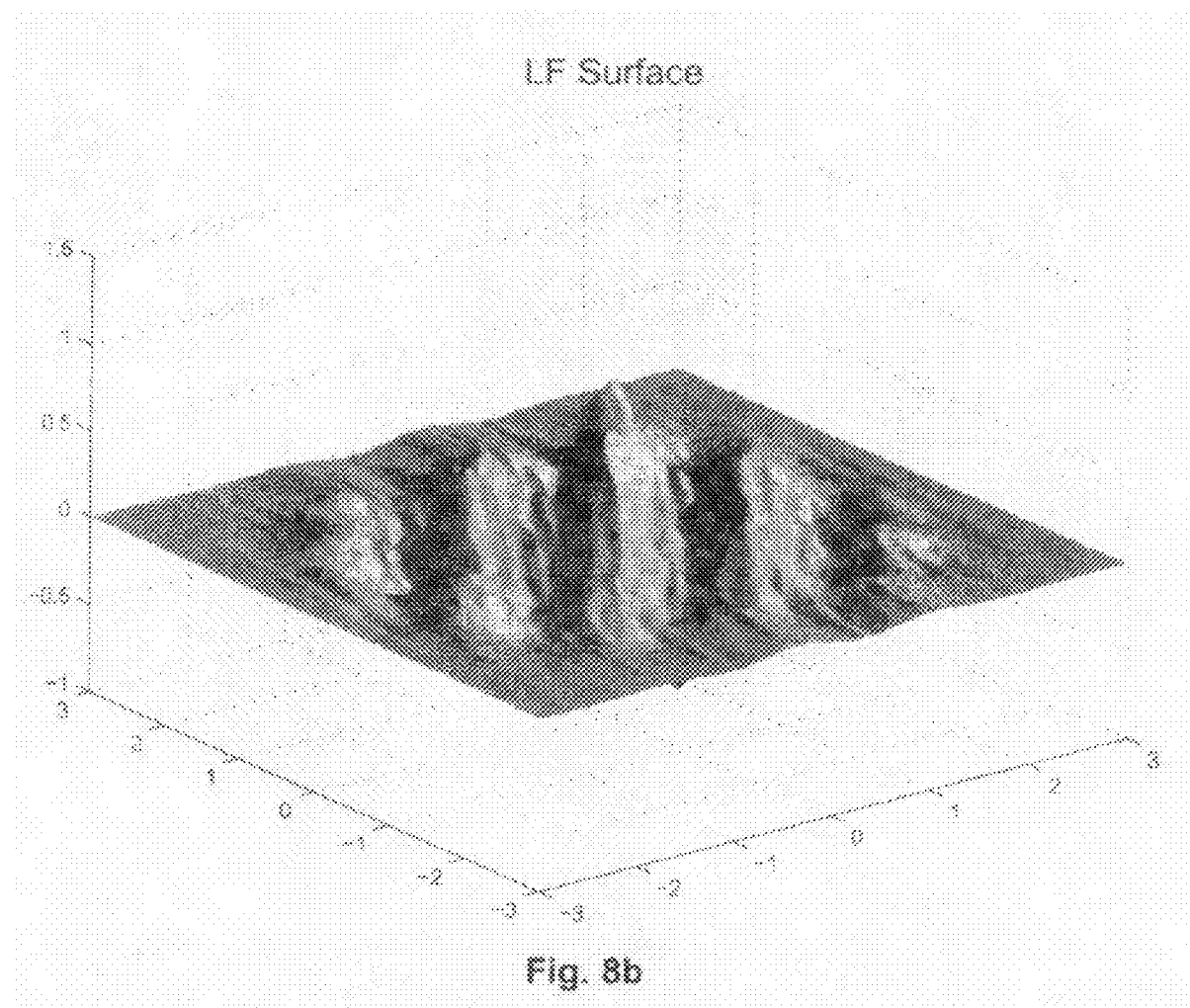
Figure 8C:
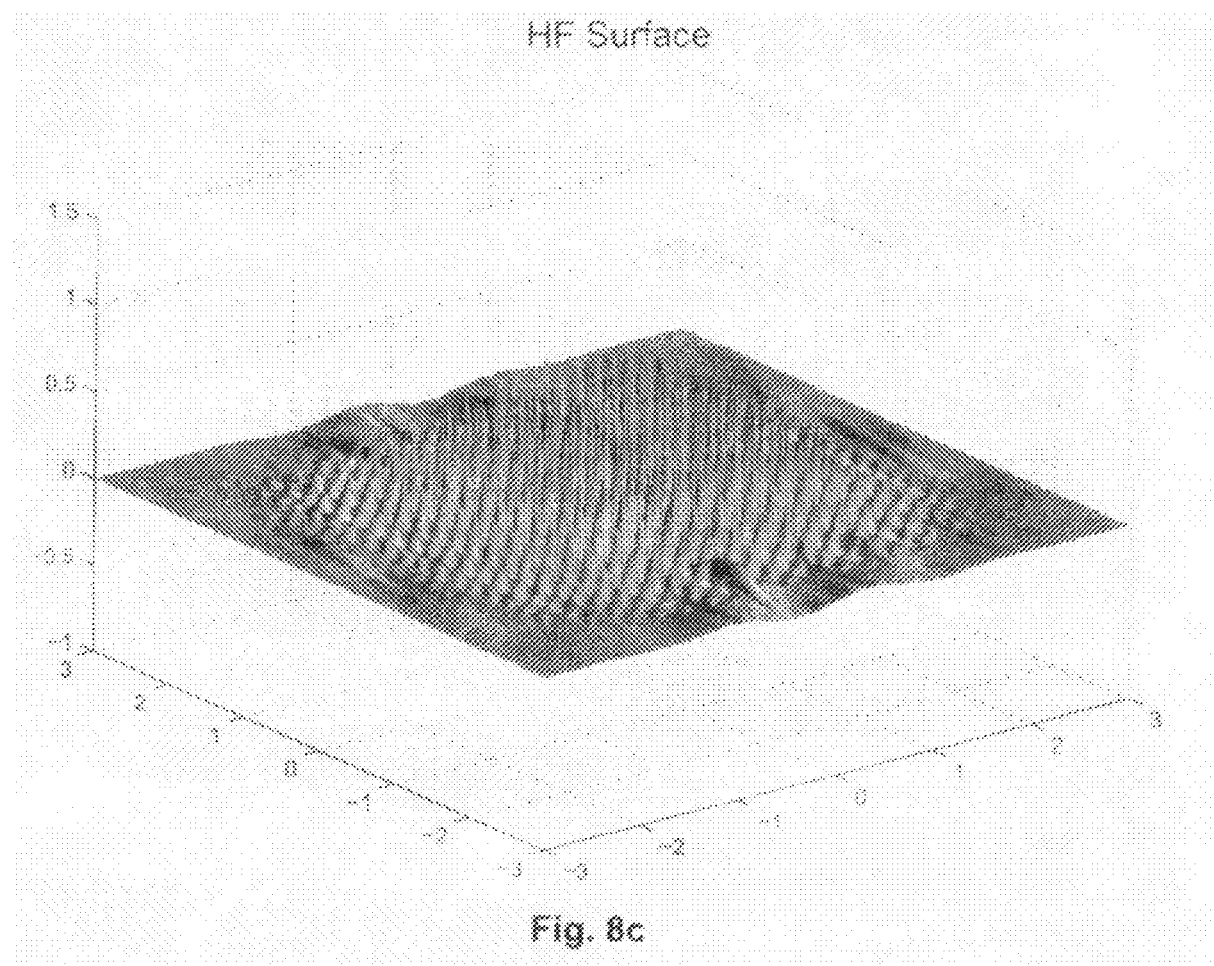
Figure 9C:
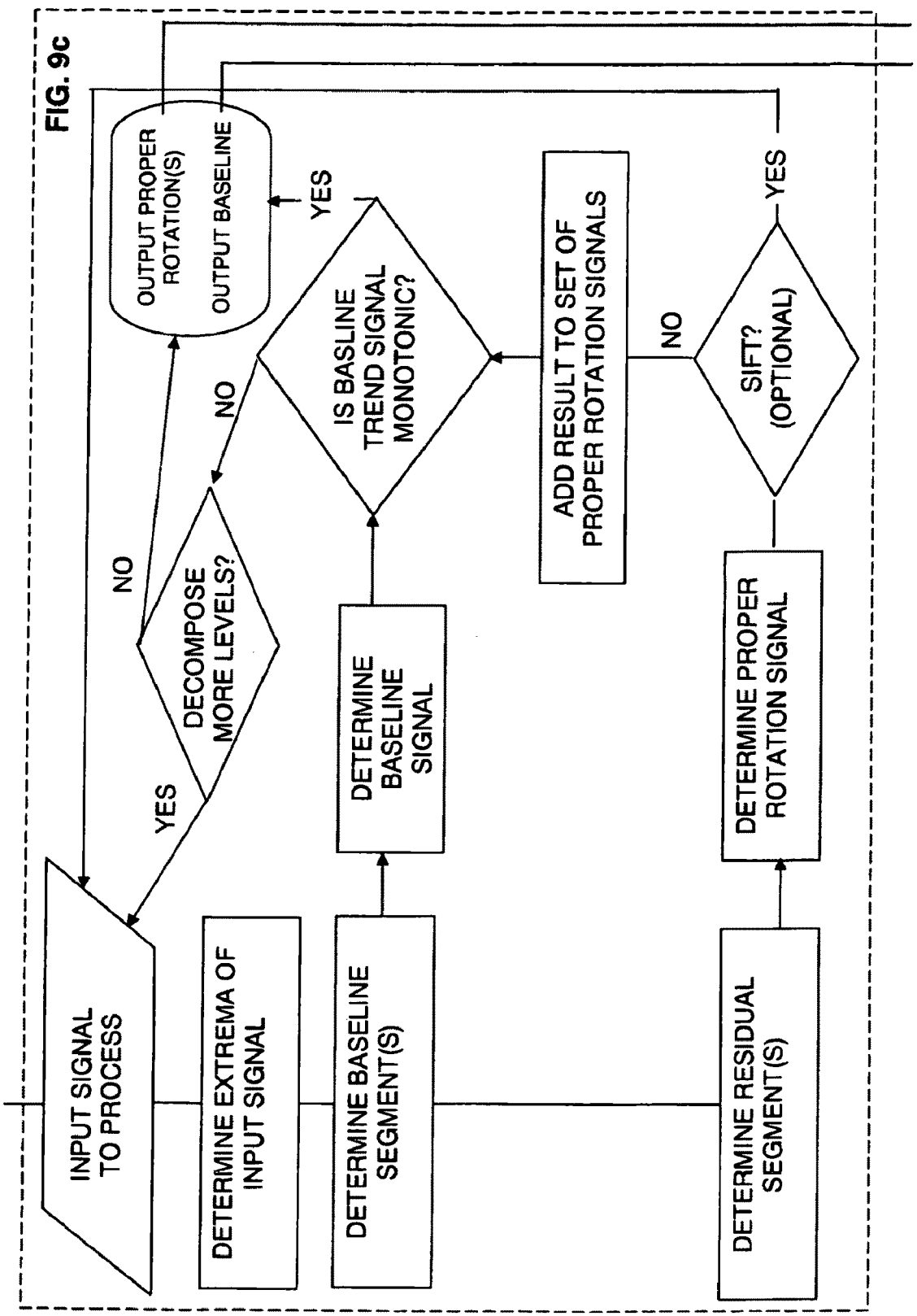
Figure 9F:
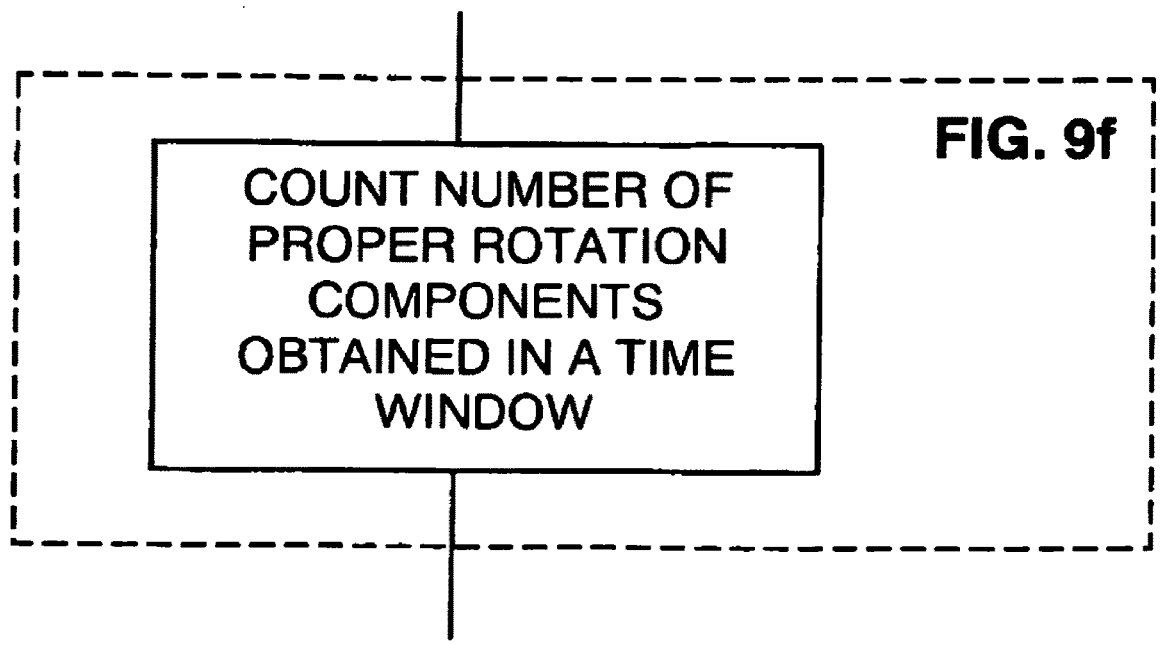

One skilled in the art will also recognize that, just as Fourier-based filtering and other decomposition methods can be successfully applied to higher dimensional analysis, so, too, can the ITD system. This extends the above-mentioned application of the ITD to decompose functions of several variables. For example, in image processing applications, one may be interested in separating an image into a high frequency component, which contains edge transitions between various objects in the image for example, and a low frequency component, which define background colors in the image for example. Two-dimensional wavelet and/or Fourier analysis are popular for image processing applications. However, the drawbacks mentioned above for these methods still exist in higher dimensional analysis. The benefits of the ITD system, such as its ability to preserve extrema and precisely localize time-frequency-energy information are preserved in higher dimensional analysis and thereby offer improvements over the most popular prior art methods. FIGS. 8a-8c illustrate the application of ITD to decompose a two-dimensional surface (shown in FIG. 8a) into two component surfaces, namely a high frequency surface (shown in FIG. 8b) and a low frequency surface (shown in FIG. 8c). The decomposition in this example is obtained by decomposing each of the cross-sectional signals of the surface along the grid lines obtained by holding the first independent variable constant, repeating the process holding the second variable constant, and averaging the two results.

The present invention may include an article of manufacture having a computer-readable medium comprising code, or a microprocessor having such code embedded therein, wherein such code causes the computer, microprocessor, or other computational apparatus to execute the inventive method.

Further scope of applicability of the present invention will become apparent from the detailed description given herein. However, it is to be understood that the detailed description and specific examples, while indicating preferred embodiments of the invention, are given by way of illustration only, since various changes and modifications within the spirit and scope of the invention will become apparent to those skilled in the art from this detailed description. Furthermore, all the mathematical expressions are used as a short hand to express the inventive ideas clearly and are not limitative of the claimed invention.

What is claimed and desired to be covered by Letters Patent is as follows:

1. A method for decomposing an input signal into a baseline signal and a residual signal or determining time-frequency-energy information of an input signal at a selected time, the method comprising the steps of:
   (a) selecting an input signal comprising data or information from geophysical signals, seismic signals, sea surface temperature signals, radiometer signals, environmental signals, biologic signals, telecommunication signals, acoustic signals, crystallographic signals, spectroscopic signals, electrical signals, magnetic signals, trajectory signals, structural vibration signals, structural resonance signals, electrical circuit signals, and financial market signals;
   (b) receiving the selected input signal into a processor;
   (c) determining a monotonic residual segment from the selected input signal with strictly negative minimum and strictly positive maximum and a baseline segment wherein said segments are defined on an interval between two successive extrema of the selected input signal and wherein the selected input signal on that interval is the sum of the baseline and residual segments;
   (d) producing a baseline output signal from the selected input signal and a residual output signal from the selected input signal wherein the baseline signal is obtained from the baseline segment and the residual segment is obtained from the residual segment as determined in step (c), such that the sum of the baseline and residual signals is equal to the selected input signal thereby forming a decomposition of the selected input signal; and
   (e) determining from the baseline output signal and the residual output signal, time-frequency-energy information at a selected time.

2. The method of claim 1, wherein the input signal is obtained by data fusion of information obtained from more than one input signal or source.

3. A method for decomposing an input signal into a baseline signal and a residual signal or determining time-frequency-energy information of an input signal at a selected time, the method comprising the steps of:
   (a) selecting an input signal from a set of input signals consisting of geographic signals, seismic signals, sea surface temperature signals, radiometer signals, environmental signals, biologic signals, telecommunication signals, acoustic signals, crystallographic signals, spectroscopic signals, electrical signals, magnetic signals, trajectory signals, structural vibration signals, structural resonance signals, electrical circuit signals, and financial market signals;
   (b) decomposing the selected input signal into a set of one or more proper rotation signals and a residual baseline trend signal;
   (c) determining at least one zero-crossing and at least one local extrema for the at least one proper rotation signals;
   (d) determining at least one time-frequency-energy information feature of the at least one proper rotation signal on an interval between the determined at least one zero-crossing and the at least one local extrema, wherein the determined at least one time-frequency-energy information feature is selected from the group comprising an instantaneous amplitude estimate, an instantaneous energy estimate, an instantaneous phase angle estimate, and an instantaneous frequency estimate.

4. The method of claim 3, wherein the input signal is obtained by data fusion of information obtained from more than one input signal or source.

* * * * *